United States Patent
Hayashi et al.

(10) Patent No.: US 10,187,207 B2
(45) Date of Patent: *Jan. 22, 2019

(54) RE-ENCRYPTION KEY GENERATOR, RE-ENCRYPTION APPARATUS, ENCRYPTION APPARATUS, DECRYPTION APPARATUS, AND STORAGE MEDIUM

(71) Applicants: KABUSHIKI KAISHA TOSHIBA, Minato-ku (JP); TOSHIBA SOLUTIONS CORPORATION, Kawasaki-shi (JP)

(72) Inventors: Ryotaro Hayashi, Hiratsuka (JP); Tatsuyuki Matsushita, Tokyo (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 210 days.

This patent is subject to a terminal disclaimer.

(21) Appl. No.: 15/261,584

(22) Filed: Sep. 9, 2016

(65) Prior Publication Data

US 2016/0380767 A1 Dec. 29, 2016

Related U.S. Application Data

(63) Continuation of application No. PCT/JP2014/076562, filed on Oct. 3, 2014.

(51) Int. Cl.
*H04L 9/00* (2006.01)
*H04L 9/08* (2006.01)
(Continued)

(52) U.S. Cl.
CPC .......... *H04L 9/0869* (2013.01); *H04L 9/0847* (2013.01); *H04L 9/0897* (2013.01);
(Continued)

(58) Field of Classification Search
USPC .......................................................... 380/45
See application file for complete search history.

(56) References Cited

U.S. PATENT DOCUMENTS 7,240,200 B2 * 7/2007 Lotspiech ............... G06F 21/64
380/201
7,769,171 B2 * 8/2010 Moreillon ........ H04N 21/43615
380/239
(Continued)

FOREIGN PATENT DOCUMENTS

WO 2014/024956 A1 2/2014

OTHER PUBLICATIONS

International Search Report dated Feb. 10, 2015 in PCT/JP2014/076562 file Oct. 3, 2014 (with English Translation).
(Continued)

*Primary Examiner* — Amare F Tabor
(74) *Attorney, Agent, or Firm* — Oblon, McClelland, Maier & Neustadt, L.L.P.

(57) ABSTRACT

According to one embodiment, a re-encryption key generator which generates the re-encryption key based on the first private key, the second re-encryption key generation key, and a plurality of random numbers. The second re-encryption key generation key comprises a plurality of system-specific values and the second private key. The re-encryption key includes an exponent having a numerator portion and a denominator portion or a scalar having a numerator portion and a denominator portion. The numerator portion is in form of a linear coupling of the second private key on which at least one of a plurality of private values specifying relations between the system-specific values and the random numbers is allowed to act. The denominator portion is the first private key.

14 Claims, 11 Drawing Sheets

(51) Int. Cl.
    *H04L 9/14*    (2006.01)
    *H04L 9/30*    (2006.01)
(52) U.S. Cl.
    CPC .................. *H04L 9/14* (2013.01); *H04L 9/30* (2013.01); *H04L 9/3073* (2013.01); *H04L 2209/76* (2013.01)

(56) References Cited

U.S. PATENT DOCUMENTS

| | | | | |
|---|---|---|---|---|
| 8,605,899 | B2* | 12/2013 | Spalka | H04L 9/0825 380/46 |
| 8,874,929 | B2* | 10/2014 | Fastring | G06F 17/30256 707/783 |
| 9,111,115 | B2* | 8/2015 | Camenisch | H04L 9/3073 |
| 2005/0195975 | A1* | 9/2005 | Kawakita | H04L 9/0822 380/30 |
| 2013/0091353 | A1* | 4/2013 | Zhang | H04L 9/3268 713/156 |
| 2014/0098960 | A1* | 4/2014 | Xu | H04L 9/0869 380/278 |

OTHER PUBLICATIONS

Written Opinion of the International Searching Authority dated Feb. 10, 2015 in PCT/JP2014/076562.

Ryotaro Hayashi, et al., "Unforgeability of Re-encryption Keys against Collusion Attack in Proxy Re-Encryption" IWSEC 2011, LNCS 7038, 2011, pp. 210-229.

Toshiyuki Isshiki, et al., "Attacks to the Proxy Re-Encryption Schemes from IWSEC2011" IWSEC 2013, LNCS 8231, 2013, pp. 290-302.

A. Menezes, et al., "Handbook of Applied Cryptography" CRC Press, 1996, pp. 462-471.

* cited by examiner

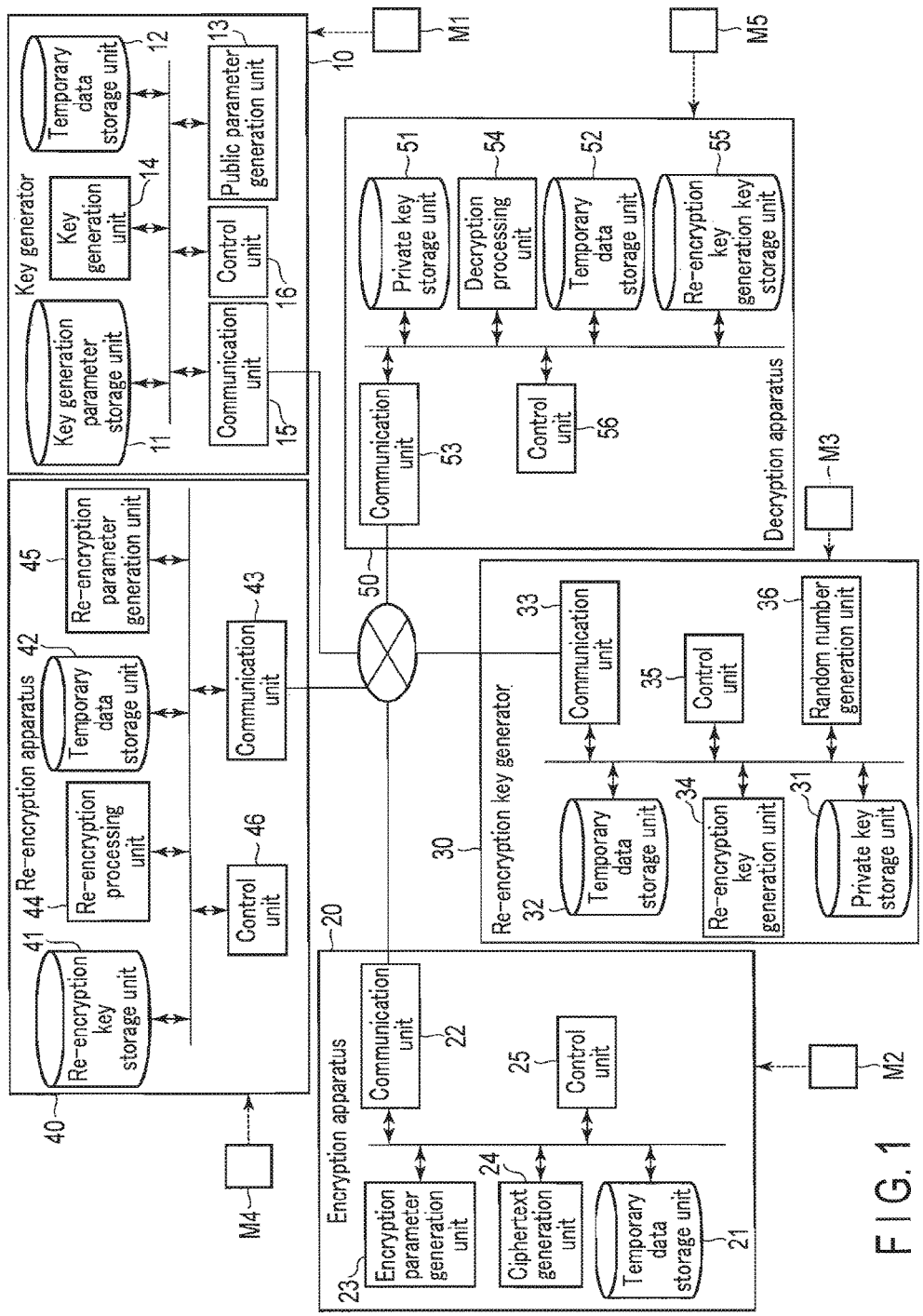
F I G. 1

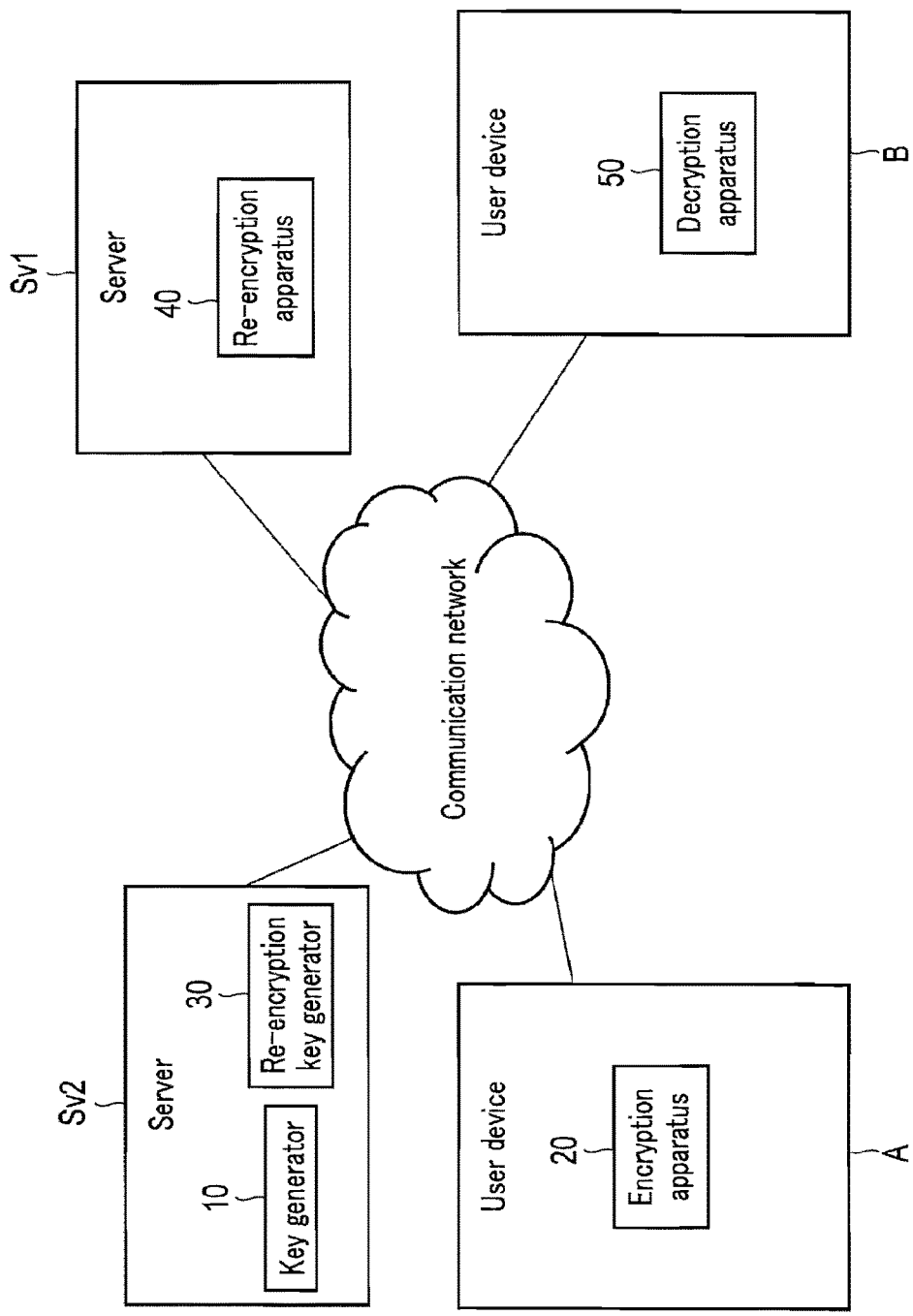
F I G. 9

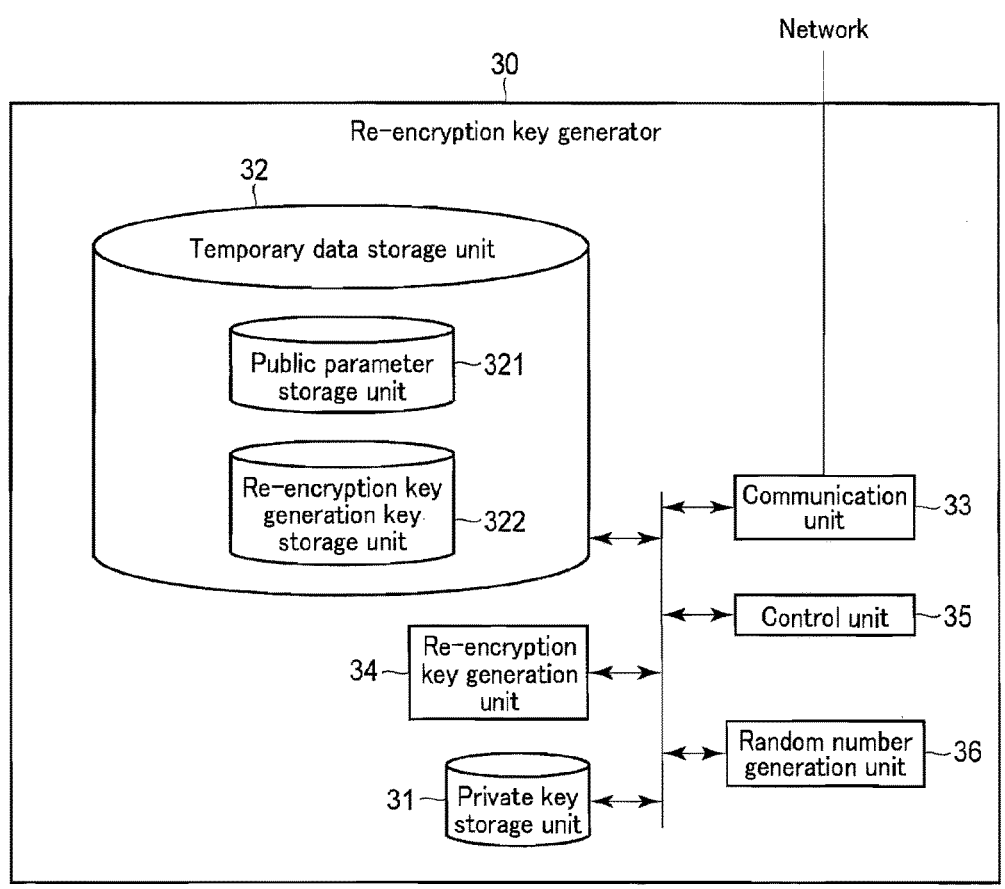
F I G. 11

RE-ENCRYPTION KEY GENERATOR, RE-ENCRYPTION APPARATUS, ENCRYPTION APPARATUS, DECRYPTION APPARATUS, AND STORAGE MEDIUM

CROSS-REFERENCE TO RELATED APPLICATIONS

This is a Continuation application of PCT application No. PCT/JP2014/076562, filed on Oct. 3, 2014, which was published under PCT Article 21(2) in Japanese.

FIELD

Embodiments described herein relate generally to a re-encryption key generator, a re-encryption apparatus, an encryption apparatus, a decryption apparatus, and a storage medium.

BACKGROUND

In a file sharing system in which the user uploads a file onto a server and in which the file is shared by a plurality of users, the following three methods (1) to (3) are used to keep the file secret from the server.

(1) An individual key system for encrypting a file by means of individual encryption keys for respective users.

(2) A common key system for encrypting a file by means of an encryption key common to the users.

(3) A re-encryption system for encrypting a file using a proxy re-encryption system.

In the systems (1) to (3), a user A is assumed to upload a file onto a server, and the user A is assumed to share the file with users B and C.

In the individual key system (1), each user has a pair of a private key and public key, which varies among the users. The user A encrypts a file by means of a public key of the user B (which is an individual encryption key for the user B), and uploads the encrypted file onto the server. Likewise, the user A encrypts a file by means of a public key of the user C (which is an individual encryption key for the user C), and uploads the encrypted file onto the server. That is, the user A encrypts a file individually for the users who share that file.

In the common key system (2), each user shares a pair of a private key and a public key, which is common to the users. The user A encrypts a file by means of a public key (which is an encryption key common to the users), and uploads the encrypted file onto the server. The users share an identical private key.

In the proxy re-encryption system (3), each user has a pair of a private key and public key, which varies among the users like in the individual key system (1). However, unlike in the individual key system (1), the user A may encrypt a file by means of a public key (to be referred to as a group public key hereinafter) of an entity (to be referred to as a group administrator hereinafter) who manages a group of users. The server uses a re-encryption key to re-encrypt an encrypted file (uploaded by the user A) to an encrypted file which can be decrypted only by each user. Details of the proxy re-encryption system will be described later.

In the individual key system (1), to share a file also with a new user D, the user A disadvantageously needs to encrypt a file using a public key of the user D (which is an individual encryption key of the user D) and to upload the encrypted file onto the server. Therefore, the system (1) is not suitable for the file sharing system because troublesome processing is needed when a new user is to be added if the system involves a large number of new users or files to be shared.

In the common key system (2), when, at a certain timing, a certain user (for whom file sharing has been permitted until that timing) is inhibited from sharing files, an additional separate mechanism is disadvantageously needed which updates the private key and the public key common to the users. Furthermore, if the private key common to the users leaks for some reason, all encrypted files can disadvantageously be decrypted (by any person who acquires the leaked private key). For this reason, the common key system (2) is not suitable for the file sharing system.

On the other hand, in the proxy re-encryption system (3), since the server uses a re-encryption key to re-encrypt one ciphertext to a ciphertext which can be decrypted only by each user, a configuration which does not notify the users of the re-encryption key is adopted to solve the aforementioned problems. For this reason, the proxy re-encryption system (3) is suitable for the file sharing system.

According to R. Hayashi, T. Matsushita, T. Yoshida, Y. Fujii, and K. Okada, "Unforgeability of Re-Encryption Keys against Collusion Attack in Proxy Re-Encryption," In Proc. IWSEC 2011, LNCS 7038, pp. 210-229, Springer-Verlag, 2011. (hereinafter referred to as Patent Literature 1), and T. Isshiki, N. Manh Ha, and K. Tanaka, "Attacks to the Proxy Re-Encryption Schemes from IWSEC2011," In Proc. IWSEC 2013, LNCS 8231, pp. 290-302, 2013 (hereinafter referred to as Patent Literature 2), in the proxy re-encryption system described in Patent Literature 1, even when the server and one user collude, a decryption right is hindered from being re-delegated without permission from a transfer source. However, no system is disclosed which also enables the security to be achieved when two or more users collude with the server.

An object of the embodiments is to provide a re-encryption key generator, re-encryption apparatus, a decryption apparatus, and a storage medium which enables the decryption right to be hindered from being re-delegated without permission from a transfer source even when the server colludes with a plurality of users.

BRIEF DESCRIPTION OF THE DRAWINGS

FIG. 1 is a block diagram depicting a configuration of a re-encryption system according to a first embodiment.

FIG. 9 is a diagram depicting an example of a configuration of a file sharing system according to the first embodiment.

FIG. 11 is a schematic diagram depicting a configuration of a re-encryption key generator according to the first embodiment.

DETAILED DESCRIPTION

Figure 2:
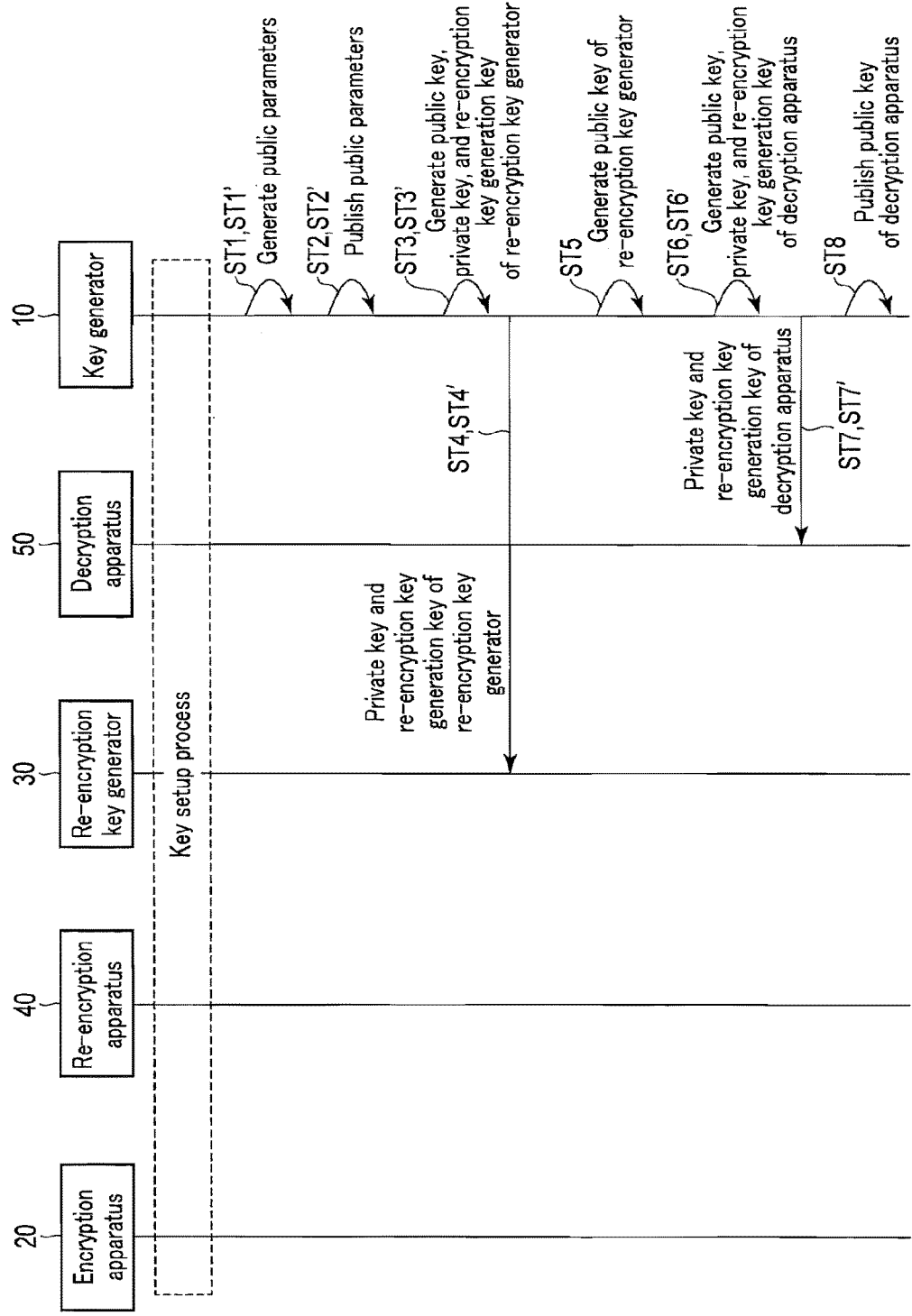
FIG. 2 is a sequence chart for illustrating operations of key setup processing according to the first embodiment.

In general, according to one embodiment, a re-encryption key generator which generates a re-encryption key needed to obtain re-encrypted text data which is configured to be decrypted by means of a second private key of a second user device, by re-encrypting, without decryption, ciphertext data obtained by encrypting plaintext data by means of a first public key of a first user device.

The re-encryption key generator comprises a first storage circuit, a second storage circuit, and a re-encryption key generation circuit.

The first storage circuit stores a first private key corresponding to the first public key.

The second storage circuit stores a second re-encryption key generation key of the second user device which is different from a second public key corresponding to the second private key.

The re-encryption key generation circuit generates the re-encryption key based on the first private key, the second re-encryption key generation key, and a plurality of random numbers.

The second re-encryption key generation key comprises a plurality of system-specific values and the second private key.

The re-encryption key includes an exponent having a numerator portion and a denominator portion or a scalar having a numerator portion and a denominator portion.

The numerator portion is in form of a linear coupling of the second private key on which at least one of a plurality of private values specifying relations between the system-specific values and the random numbers is allowed to act.

The denominator portion is the first private key.

Embodiments will be described hereinafter with reference to the drawings. Note that each of the following apparatuses can be implemented by either a hardware configuration or a combined configuration of hardware resources and software. As the software of the combined configuration, programs are used which are installed from a network or non-transitory computer-readable storage media M1 to M5 in a computer in advance, and are executed by processors in the computer to implement functions of corresponding apparatuses, as depicted in FIG. 1.

First Embodiment

A proxy re-encryption system will be described first. A basic model of the proxy re-encryption system includes five functions (to be also referred to as algorithms hereinafter), that is, key generation, encryption, decryption, re-encryption key generation, and re-encryption. The key generation function, the encryption function, and the decryption function are the same as those of normal public key cryptosystem.

(Key generation) KeyGen($\lambda$)→(pk,sk)

Upon receiving a security parameter $\lambda$, a key generation algorithm KeyGen outputs a pair (pk, sk) of a public key pk and private key sk.

(Encryption) Enc($pk_A$,m)→$C_A$

Upon receiving a public key $pk_A$ of a user A and a message m, an encryption algorithm Enc outputs ciphertext $C_A$ for a user A.

(Decryption) Dec($sk_A$,$C_A$)→m

Upon receiving a private key $sk_A$ of the user A and the ciphertext $C_A$ for the user A, a decryption algorithm Dec outputs the message m.

(Re-encryption key generation) ReKeyGen($pk_A$,$sk_A$, $pk_B$,$sk_B$)→$rk_{A\to B}$ Upon receiving the public key $pk_A$ of the user A, the private key $sk_A$ of the user A, a public key $pk_B$ of a user B, and a private key $sk_B$ of the user B, a re-encryption key generation algorithm ReKeyGen outputs a re-encryption key $rk_{A\to B}$.

(Re-encryption) ReEnc($rk_{A\to B}$,$C_A$)→$C_B$

Upon receiving the re-encryption key $rk_{A\to B}$ and the ciphertext $C_A$ for the user A, a re-encryption algorithm ReEnc outputs a ciphertext $C_B$ for the user B.

The basic model has been described. However, according to the re-encryption implementation method used, models having different inputs to functions, and models including functions and keys other than those which have been described above have also been proposed.

For example, like the re-encryption method shown in the present embodiment, public parameters (details will be described later) may be included for input into each function of the encryption, decryption, re-encryption key generation, and re-encryption.

For example, like in the re-encryption method shown in the present embodiment, a model called "non-interactive" which obviates the need to input the private key $sk_B$ of the user B to the re-encryption key generation algorithm has been proposed. Also, a model in which the re-encryption key $rk_{A\to B}$ for the user B and a private key $sk_C$ of a user C are input in place of the private key $sk_A$ of the user A has also been proposed.

A model called "unidirectional" is also known which allows re-encryption of ciphertext $C_A \to C_B$ by means of the re-encryption key $rk_{A\to B}$, while inhibits inverse conversion of ciphertext $C_B \to C_A$, and a model called "bidirectional" is further known which also permits the inverse conversion. Note that in the bidirectional model, the re-encryption key $rk_{A>B}$ may also be expressed as $rk_{A\leftrightarrow B}$.

Furthermore, a system based on ID-based encryption, which is a type of the public key cryptosystem, has been proposed. In this case, more function setup processing is needed for master key generation, and a master key and an ID are additionally input to the key generation algorithm. In the ID-based encryption, the public key pk is an ID itself.

Furthermore, the re-encryption key generation algorithm ReKeyGen may receive the re-encryption key generation key $rk_B$ of the user B instead of the public key $pk_B$ of the user B. In this case, the key generation algorithm KeyGen and the re-encryption key generation algorithm ReKeyGen are expressed as follows.

(key generation) KeyGen($\lambda$)→(pk,sk,rk,par)

Upon receiving the security parameter $\lambda$, the key generation algorithm KeyGen outputs a set (pk, sk, rk) of the public key pk, the private key sk, and the re-encryption key generation key rk, and public parameters par. In the present embodiment, this processing is referred to as key setup. This also applies to embodiments and modifications described below.

(re-encryption key generation) ReKeyGen($sk_A$,$rk_B$, par)→$rk_{A\to B}$

Upon receiving the private key sk of the user A, the re-encryption key generation key rkB of the user B, and the public parameters par, the re-encryption key generation algorithm ReKeyGen outputs the re-encryption key $rk_{A \to B}$.

Furthermore, as inputs to the re-encryption algorithm ReEnc, the public key $pk_A$ of the user A and the public parameters par may be added as in the re-encryption system illustrated in the present embodiment. In this case, the re-encryption algorithm ReEnc is expressed as follows.

(re-encryption) $ReEnc(rk_{A \to B}, C_A, pk_A, par) \to C_B$

Upon receiving the re-encryption key $rk_{A \to B}$, the ciphertext $C_A$ for the user A, the public key $pk_A$ of the user A, and the public parameters par, the re-encryption algorithm ReEnc outputs the ciphertext $C_B$ for the user B.

Figure 7:
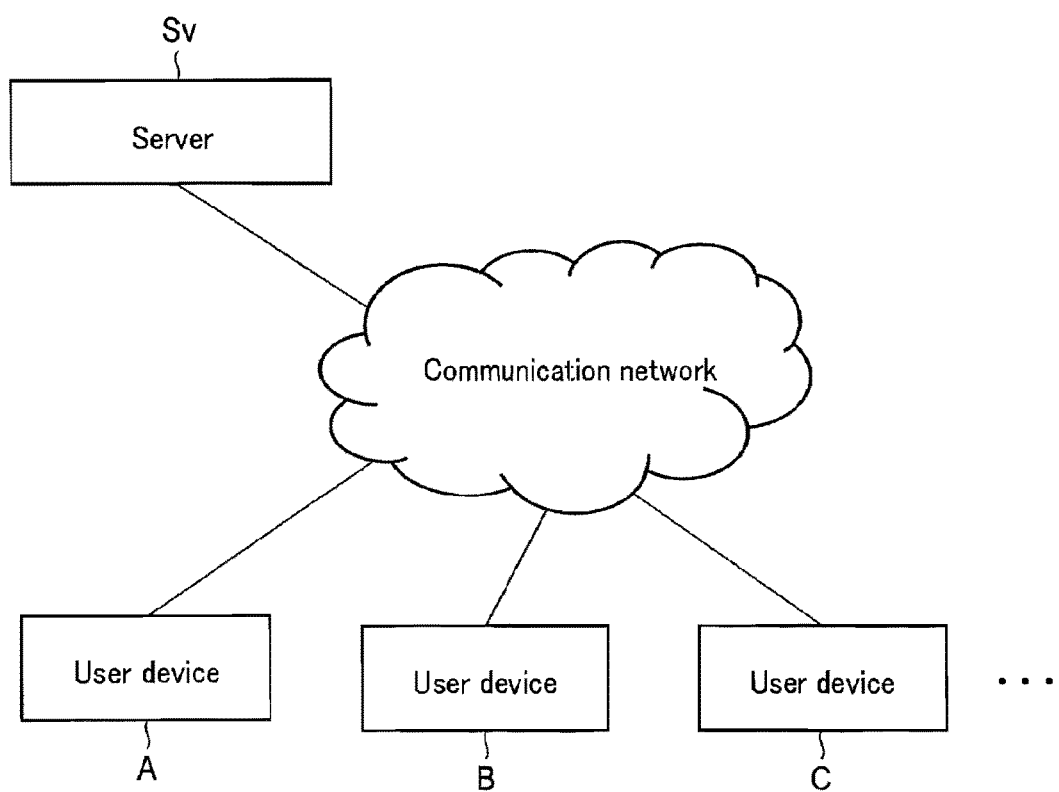
FIG. 7 is a block diagram depicting an example of a configuration of a file sharing system according to the first embodiment.

A configuration of a file sharing system according to the present embodiment will be described below with reference to FIG. 7. The file sharing system includes a server Sv as an information processing apparatus possessed by a service provider which provides a service, and user devices A, B, C, . . . as information processing apparatuses possessed by users of the service. The server Sv and user devices A, B, C, . . . are connected via a communication network. Examples of the communication network includes a wireless LAN (Local Area Network), wired LAN, optical communication network, telephone communication network, intranet, Ethernet™, Internet, and combinations thereof. Note that one of more servers Sv may be provided.

Figure 8:
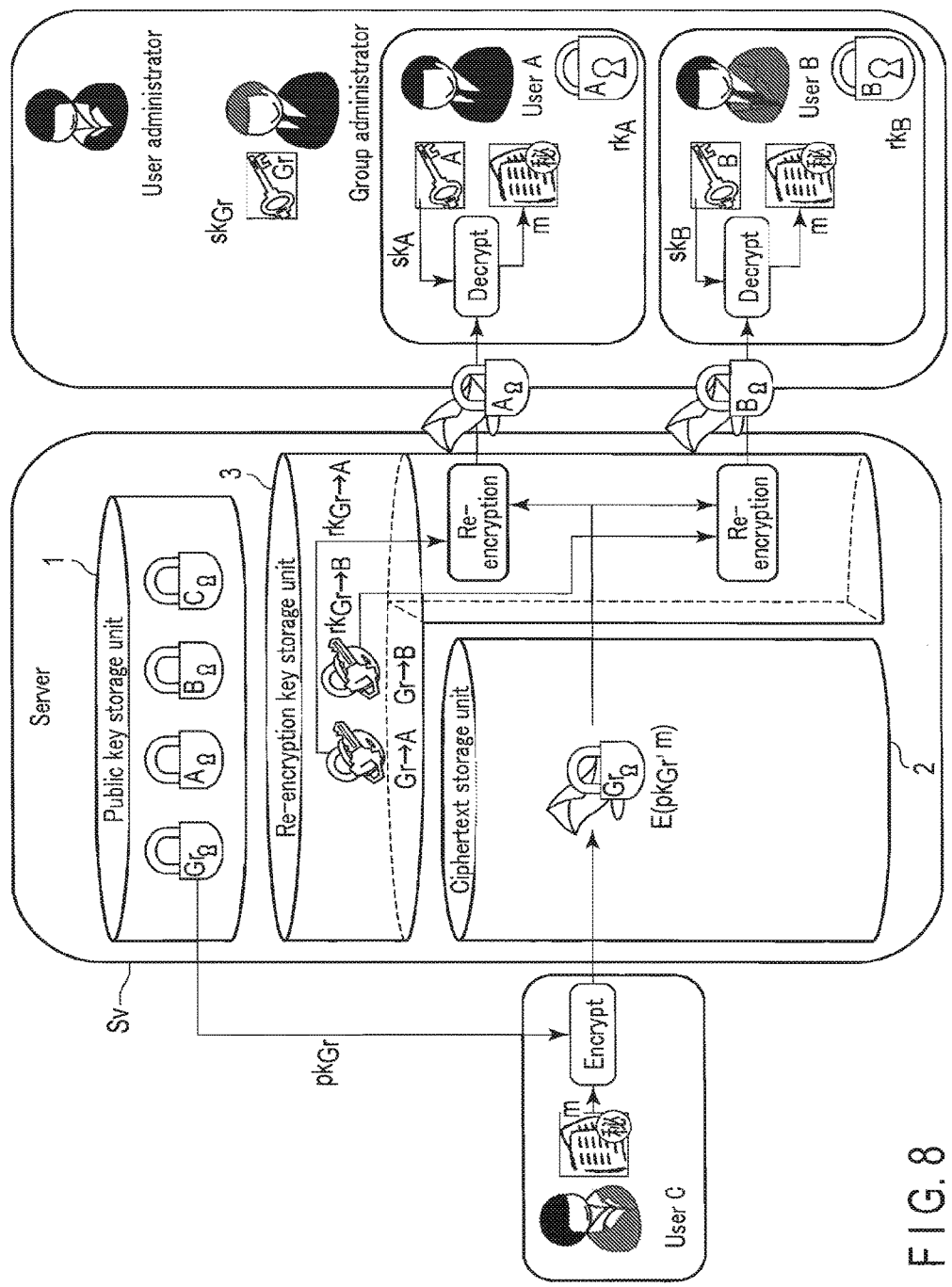
FIG. 8 is a diagram of the file sharing system according to the first embodiment.

FIG. 8 is a diagram depicting the file sharing system. This file sharing system includes the server Sv, the user A, the user B, the user C, a group administrator, and a user administrator. The user administrator is an entity which manages all the users. The user administrator issues an ID and initial password which allow each user to log into the file sharing system, to the user.

In advance preparations, the group administrator is assumed to have a private key $sk_{Gr}$. Furthermore, a public key $pk_{Gr}$ of the group administrator is assumed to be stored in a public key storage unit 1 of the server Sv. Each user i is assumed to have a private key $sk_i$ and a re-encryption key generation key $rk_i$. In other words, the user A has $sk_A$ and $rk_A$, the user B has $sk_B$ and $rk_B$, and the user C has $sk_C$ and $rk_C$. The server Sv and each user i can acquire the public parameters par and the public key $pk_i$ of the user i. However, this is not described here but will be described below in detail. A file of a plaintext to be shared is denoted by m.

Next, the user C encrypts the file m by means of the public key $pk_{Gr}$ of the group administrator, which is stored in the public key storage unit 1, and uploads a resultant ciphertext $E(pk_{Gr}, m)$ onto the server Sv. Note that E (PK, M) denotes a ciphertext resulting from encryption of a plaintext M using a public key PK. The server Sv stores the ciphertext in a ciphertext storage unit 2.

Now, the user A is assumed to accept to share the file m. The user A transmits the re-encryption key generation key $rk_A$ of the user A to the group administrator. The group administrator uses the private key $sk_{Gr}$ of the group administrator and the re-encryption key generation key $rk_A$ to generate a re-encryption key generation key $rk_{Gr \to k}$ that re-encrypts a ciphertext $E(pk_{Gr}, m)$ for the group administrator to a ciphertext $E(pk_A, m)$ for the user A. The group administrator transmits the resultant re-encryption key $rk_{Gr \to A}$ to the server Sv. The server Sv stores the re-encryption key $rk_{Gr \to A}$ in the re-encryption key storage unit 3.

The user A transmits a request for re-encryption of the ciphertext $E(pk_{Gr}, m)$ to the server Sv. In response to the request from the user A, the server Sv re-encrypts the ciphertext $E(pk_{Gr}, m)$ to a re-encrypted text $E(pk_A, m)$ using the re-encryption key $rk_{Gr \to A}$ for the user A stored in the re-encryption key storage unit 3. The server Sv then transmits the resultant re-encrypted text $E(pk_A, m)$ to the user A. Note that the re-encrypted text is a ciphertext resulting from re-encryption of a ciphertext.

The user A uses the private key $sk_A$ held by the user A to decrypt the re-encrypted text $E(pk_A, m)$ downloaded from the server Sv, and utilizes the resulting file m.

The file sharing system as described above never decrypts the file m from the encryption by the user C until the decryption by the user A, allowing information to be inhibited from leaking during the process of file sharing.

The user C need not determine with which user the user S shares the file at the timing to upload the ciphertext. That is, the user C may encrypt the file m by means of the public key $pk_{Gr}$ of the group administrator, and needs to manage only the public key $pk_{Gr}$ of the group administrator in association with encryption, thus reducing the costs of key management.

In the present file sharing system, the server Sv does not have the decryption key $sk_{Gr}$ used to decrypt the ciphertext $E(pk_{Gr}, m)$. Therefore, the server Sv is precluded from decrypting the ciphertext. This means that there is no threat of an illicit server Sv decrypting a ciphertext and leaking the resultant information, eliminating the need for strict management of the server Sv. Thus, management costs for the server Sv are reduced.

In the proxy re-encryption system, a ciphertext for a transfer source (in the above-described example, the group administrator) is re-encrypted to a ciphertext for a transfer destination (in the above-described example, the user A) to delegate a decryption right for the ciphertext to the transfer destination. Note that, in the proxy re-encryption system, the inputs to the re-encryption key generation algorithm ReKeyGen include the public key of the transfer destination (and does not include the private key of the transfer destination). Thus, for example, to allow the user i to encrypt another file m' using the public key $pk_A$ of the user A to generate the ciphertext $E(pk_A, m)$ for the user A, the public key $pk_A$ of the user A is pre-published (for example, when the system is started up).

On the other hand, even if the user A does not accept to delegate the decryption right for the ciphertext to the user A, the group administrator can generate re-encryption key $rk_{Gr \to A}$ because the public key $pk_A$ of the user A has already been published. Therefore, re-encryption may be performed without permission from the user A (in other words, the decryption right for the ciphertext is delegated to the user A).

In contrast, in the present file sharing system, the group administrator is precluded from generating the re-encryption key $rk_{Gr \to A}$ unless the user A as a transfer destination transmits the re-encryption key generation key $rk_A$ to the group administrator. Therefore, re-encryption without permission from the transfer destination (in other words, delegation of the decryption right for the ciphertext to the transfer destination) can be precluded.

The same applies to a case of file sharing performed by the user B.

FIG. 1 is a block diagram depicting a configuration of a re-encryption system according to a first embodiment. (The correspondence relation between FIGS. 1 and 8 will be described later.) The re-encryption system includes a key generator 10, an encryption apparatus 20, a re-encryption key generator 30, a re-encryption apparatus 40, and a decryption apparatus 50. Based on the security parameter, the key generator 10 generates the public parameters of the re-encryption system and a pair of a public key and a private key and a re-encryption key generation key for each of the apparatuses 40 and 50. Note that the re-encryption key generation key is different from the public key corresponding to the private key of each of the apparatuses 30 and 50. The term "re-encryption key generation key" may be interchanged with a desired name, for example, "re-encryption key generation data" or "re-encryption key generation permission data".

The encryption apparatus 20 encrypts plaintext data using the public key corresponding to the private key of the re-encryption key generator 30 and the public parameters, and transmits resultant ciphertext data to the re-encryption apparatus 40.

The re-encryption key generator 30 generates a re-encryption key using the private key of the re-encryption key generator 30, the re-encryption key generation key of the decryption apparatus 50, and a plurality of random numbers. The re-encryption key generator 30 then transmits the resultant re-encryption key to the re-encryption apparatus 40. The re-encryption key generation key of the decryption apparatus 50 is different from the public key corresponding to the private key of the decryption apparatus 50. Furthermore, in the present embodiment, the re-encryption key is generated based on the private key of the re-encryption key generator 30, the re-encryption key generation key of the decryption apparatus 50, the public parameters, and the plurality of random numbers. However, the direct use of the random numbers during generation of the re-encryption key is not essential, but the re-encryption key may be generated based on the random numbers. For example, the re-encryption key may be generated using a value "θ1+θ2" based on a random number θ (=θ1+θ2) instead of directly using the random number θ.

Based on the public key of the re-encryption key generator 30, the public parameters, and the re-encryption key received from the re-encryption key generator 30, the re-encryption apparatus 40 executes verification processing on the ciphertext data received from the encryption apparatus 20 and re-encrypts, without decryption, the ciphertext data received from the encryption apparatus 20. The re-encryption apparatus 40 transmits resultant re-encrypted text data to the decryption apparatus 50. However, the verification process is not essential and may be omitted.

Based on the private key of the decryption apparatus 50 and the public parameters, the decryption apparatus 50 executes verification processing on the re-encrypted text data received from the re-encryption apparatus 40 and also executes decryption processing on the re-encrypted text data received from the re-encryption apparatus 40 to obtain plaintext data. For each of the key generator 10, the encryption apparatus 20, the re-encryption key generator 30, and the re-encryption apparatus 40, a plurality of apparatuses may be provided, but a single apparatus is provided here by way of example. Furthermore, the encryption apparatus 20 may transmit ciphertext data resulting from encryption of plaintext data using the public key of the encryption apparatus 20 and the public parameters, to the re-encryption apparatus 40. In this case, the key generator 10 generates public parameters and a pair of a public key and a private key and a re-encryption key generation key for each of the apparatuses 20 and 50. The re-encryption key generator 30 generates a re-encryption key using the private key of the encryption apparatus 20, the re-encryption key generation key of the decryption apparatus 50, the public parameters, and the plurality of random numbers. The re-encryption key generator 30 transmits the resultant re-encryption key to the re-encryption apparatus 40.

The correspondence relation between FIGS. 1 and 8 will be described below. The apparatuses 10 to 50 are held by entities which execute the corresponding processes. If a user generates a pair of a public key and a private key and a re-encryption key generation key for the user, the user holds the key generator 10. Note that when, for example, the user administrator or the group administrator generates a pair of a public key and a private key for each user, the user administrator or the group administrator holds the key generator 10. The user holds one or both of the encryption apparatus 20 and the decryption apparatus 50. The group administrator holds the re-encryption key generator 30. Note that, for example, the user administrator or the server Sv holds the re-encryption key generator 30 when generating a re-encryption key. The server Sv holds the re-encryption apparatus 40. In the file sharing system exemplified in FIG. 8, the server Sv holds the public key storage unit 1, and the user C who executes encryption acquires a public key used for encryption from the public key storage unit 1. However, the present invention is not limited to this, and the user C may acquire the public key used for encryption from the key generator 10 (which generates the public key used for encryption). Additionally, the server Sv stores the ciphertext $E(pk_{Gr}, m)$ generated by the user C in the ciphertext storage unit 2. Alternatively, the ciphertext storage unit 2 may be included in the re-encryption apparatus 40 or may be an external storage device which is not included in the re-encryption apparatus 40.

Each entity may hold some or all of the key generator 10, the encryption apparatus 20, the re-encryption key generator 30, the re-encryption apparatus 40, and the decryption apparatus 50. In other words, which entity holds which apparatus is not limited to the aforementioned example, and variations are possible. The user administrator or the group administrator may be the same or different. Furthermore, the user may or may not serve as the group administrator, the user administrator, or both. The user administrator or the group administrator may or may not serve as a user. The different user devices used by the respective users may also be referred to as a first user device, second user device, . . . . Likewise, public keys, private keys, and re-encryption key generation keys of the user devices may also be referred to as a first public key, a first private key, and a re-encryption key generation key of the first user device, a second public key, a second private key, and a re-encryption key generation key of the second user device, . . . .

Figure 10:
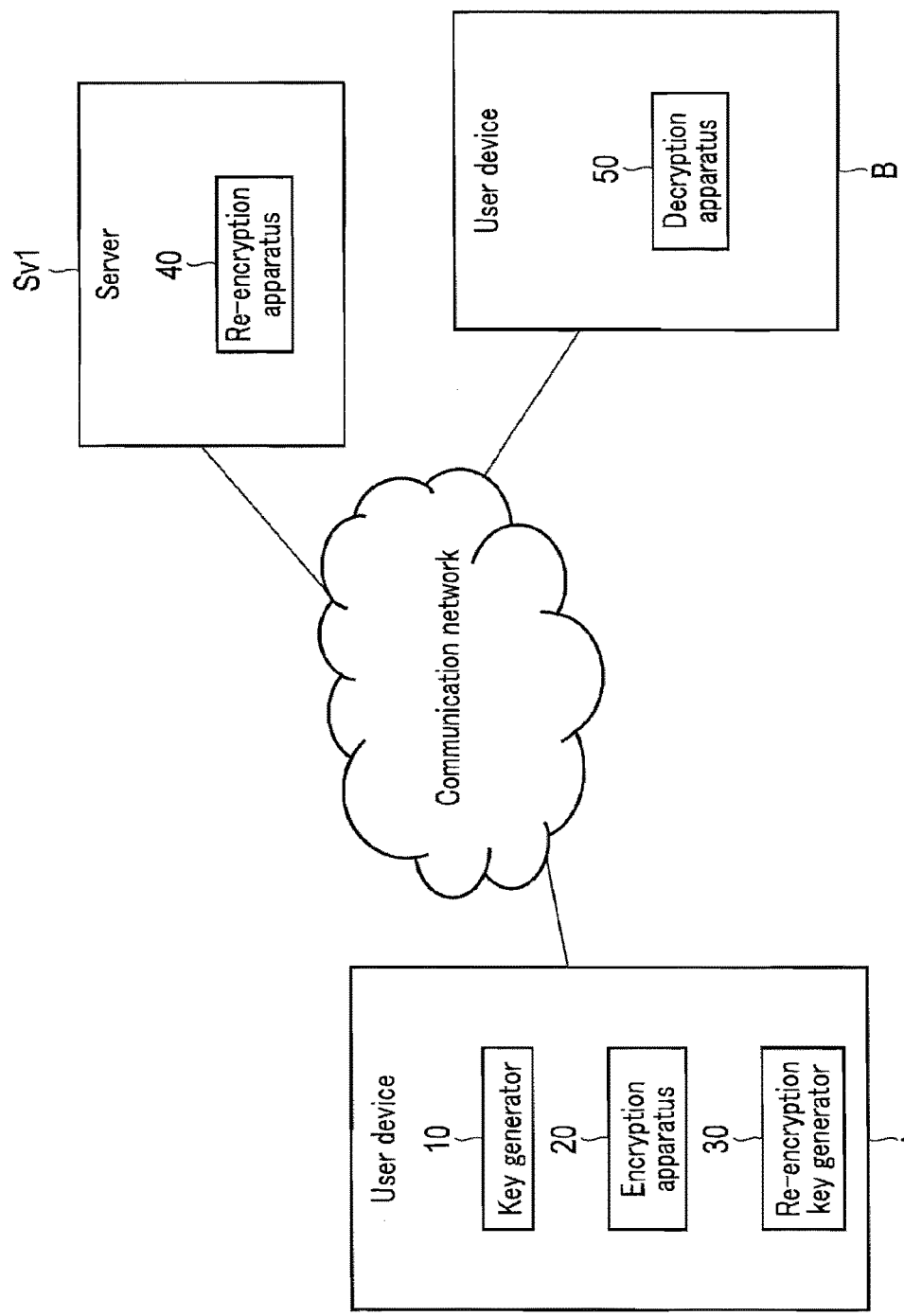
FIG. 10 is a diagram depicting an example of a configuration of a file sharing system according to the first embodiment.

Furthermore, the different entities may hold the respective apparatuses, for example, as depicted in FIGS. 9 and 10. In FIG. 9, a server SV2 holds the key generator 10 to generate public parameters, a pair of a public key and a private key and a re-encryption key generation key for the user A, and a pair of a public key and a private key and a re-encryption key generation key for the user B. The server Sv2 passes, to the user A, the public parameters and the pair of the public key and the private key and the re-encryption key generation key for the user A, passes, to the user B, the public parameters and the pair of the public key and the private key and the re-encryption key generation key for the user B, and passes the public parameters and the public key of the user A to a server Sv1. The user A holds the encryption apparatus 20, encrypts plaintext data using the public key of the user A and the public parameters, and transmits resultant ciphertext data to the server Sv1. The server Sv2 holds the re-encryption key generator 30, generates a re-encryption key based on the private key of the user A, the re-encryption key generation key of the user B, the public parameters, and the plurality of random numbers, and passes the resultant re-encryption key to the server Sv1. The server Sv1 holds the re-encryption apparatus 40, executes verification processing on the ciphertext data received from the user A based on the public key of the user A, the public parameters, and the re-encryption key received from the server Sv2, and re-encrypts, without decryption, the ciphertext data received from the user A to pass resultant re-encrypted text data to the user B. The user B holds the decryption apparatus 50, executes verification processing on the re-encrypted text data received from the server Sv1 based on the private key of the user B and the public parameters, and executes decryption processing on the re-encrypted text data received from the server Sv1 to obtain plaintext data. Transmission of data between the entities is not limited to electric communication such as wired or wireless communication but may be physical communication, for example, delivery or handover of a storage medium storing data such as the re-encryption key generation key, the re-encryption key, the ciphertext data, or the re-encrypted text data. Alternatively, transmission of data between the entities may be a combination of the electric communication and the physical communication.

In FIG. 10, the user A holds the key generator 10 to generate public parameters, a pair of a public key and a private key and a re-encryption key generation key for the user A, and a pair of a public key and a private key and a re-encryption key generation key for the user B. The user A passes, to the user B, the public parameters and the pair of the public key and the private key and the re-encryption key generation key for the user B, and passes the public parameters and the public key of the user A to a server Sv1. The user A holds the encryption apparatus 20, encrypts plaintext data using the public key of the user A and the public parameters, and transmits resultant ciphertext data to the server Sv1. The user A holds the re-encryption key generator 30, generates a re-encryption key based on the private key of the user A, the re-encryption key generation key of the user B, the public parameters, and the plurality of random numbers, and passes the resultant re-encryption key to the server Sv1. The server Sv1 holds the re-encryption apparatus 40, executes verification processing on the ciphertext data received from the user A based on the public key of the user A, the public parameters, and the re-encryption key received from the user A, and re-encrypts, without decryption, the ciphertext data received from the user A to pass resultant re-encrypted text data to the user B. The user B holds the decryption apparatus 50, executes verification processing on the re-encrypted text data received from the server Sv1 based on the private key of the user B and the public parameters, and executes decryption processing on the re-encrypted text data received from the server Sv1 to obtain plaintext data.

Configurations of the apparatuses 10 to 50 will be described in detail below.

The key generator 10 includes a key generation parameter storage unit 11, a temporary data storage unit 12, a public parameter generation unit 13, a key generation unit 14, a communication unit 15, and a control unit 16. The key generation parameter storage unit 11, the temporary data storage unit 12, the public parameter generation unit 13, the key generation unit 14, the communication unit 15, and the control unit 16 may also be referred to as a key generation parameter storage circuit 11, a temporary data storage circuit 12, a public parameter generation circuit 13, a key generation circuit 14, a communication circuit 15, and a control circuit 16, respectively.

The key generation parameter storage unit 11 is a storage device which stores key generation parameters.

The temporary data storage unit 12 is a storage device which stores tentative data (to be also referred as temporary data hereinafter) such as intermediate processing data and processing result data of each of the generation units 13 and 14.

The public parameter storage unit 13 generates public parameters for key generation.

The generation unit 14 generates pairs each of a public key and private key and re-encryption key generations.

The communication unit 15 is a communication interface needed to communicate with other apparatuses 20 to 5C, and has, for example, a function to transmit the pairs of the public key and the private key and the re-encryption key generation keys of 30 and 50 stored in the temporary data storage unit 12 to the apparatuses 30 and 50 under the control of the control unit 16, a function to transmit the public key of the re-encryption key generator 30 stored in the temporary data storage unit 12 to the encryption apparatus 20 under the control of the control unit 16, and a function to transmit the public parameters and the public key of the re-encryption key generator 30 stored in the temporary data storage unit 12 to the re-encryption apparatus 40 under the control of the control unit 16. Note that in the following description, the mediation of the communication unit 15 during transmission and reception may be omitted to avoid redundant descriptions of the transmission and reception. The same applies to communication units of other apparatuses 20 to 50.

The control unit 16 has a function to controllably allow the units 11 to 15 to execute the operations depicted in FIG. 2.

The encryption apparatus 20 includes a temporary data storage unit 21, a communication unit 22, an encryption parameter generation unit 23, a ciphertext generation unit 24, and a control unit 25. The temporary data storage unit 21, the communication unit 22, the encryption parameter generation unit 23, the ciphertext generation unit 24, and the control unit 25 may also be referred to as a temporary data storage circuit 21, a communication circuit 22, a encryption parameter generation circuit 23, a ciphertext generation circuit 24, and a control circuit 25, respectively.

The temporary data storage unit 21 is a storage device which stores the public key of the re-encryption key generator 30 received from the key generator 10, and tentative data (to be also referred to as temporary data hereinafter) such as intermediate processing data and processing result data of the generation units 23 and 24.

The communication unit 22 is a communication interface needed to communicate with other apparatuses 10 and 30 to 50, and has, for example, a function to acquire and write the public parameters and the public key of the re-encryption key generator 30 received from the key generator 10, to the temporary data storage unit 21, and a function to transmit ciphertext data stored in the temporary data storage unit 21 to the re-encryption apparatus 40 under the control of the control unit 25.

The encryption parameter generation unit 23 has a function to generate encryption parameters.

The ciphertext generation unit 24 has, for example, a function to generate ciphertext data by encrypting plaintext data using the public parameters par and the public key (the first public key of the first user device) of the re-encryption key generator 30 which are read out from the temporary data storage unit 21, and a function to write the resultant ciphertext data to the temporary storage unit 21.

Figure 3:
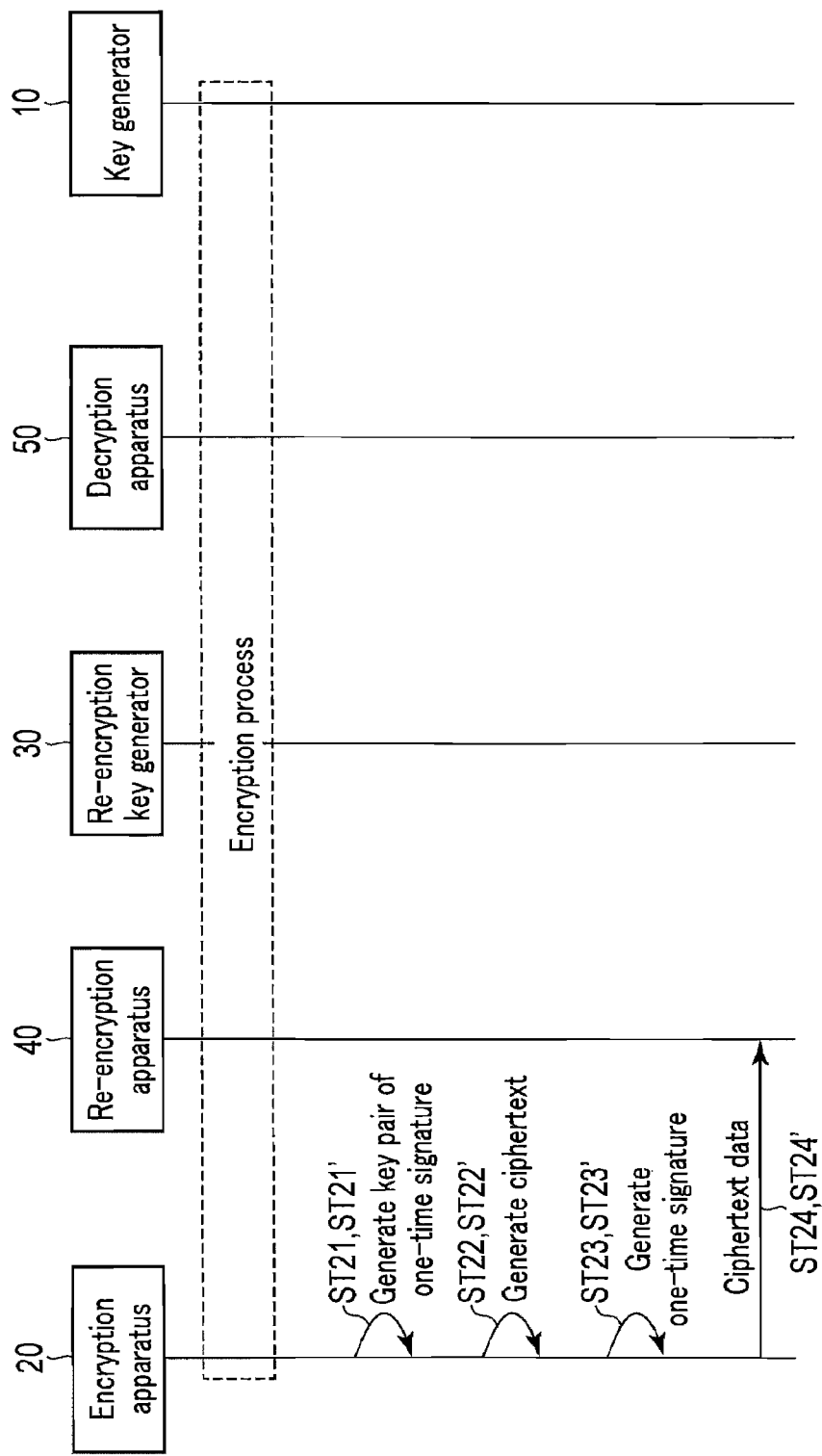
FIG. 3 is a sequence chart for illustrating operations of encryption processing according to the first embodiment.

The control unit 25 has a function to controllably allow the units 21 to 24 to execute operations depicted in FIG. 3.

The re-encryption key generator 30 includes a private key storage unit 31, a temporary data storage unit 32, a communication unit 33, a re-encryption key generation unit 34, a control unit 35, and a random number generation unit 36. The private key storage unit 31, the temporary data storage unit 32, the communication unit 33, the re-encryption key generation unit 34, the control unit 35, and the random number generation unit 36 may also be referred to as a private key storage circuit 31, a temporary data storage circuit 32, a communication circuit 33, a re-encryption key generation circuit 34, a control circuit 35, and a random number generation circuit 36, respectively.

The private key storage unit 31 is a storage device which stores the private key of the re-encryption key generator 3C received from the key generator 10.

The temporary data storage unit 32 is a storage device which stores the public key of the decryption apparatus 50 received from the key generator 10, and temporary data such as intermediate processing data and processing result data of the re-encryption key generation unit 34.

The communication unit 33 is a communication interface needed to communicate with other apparatuses 10, 20, 40, and 50, and has, for example, a function to acquire and write the public parameters and the re-encryption key generation key of the decryption apparatus 50 received from the key generator 10, to the temporary data storage unit 32, and a function to transmit the re-encryption key stored in the temporary data storage unit 32 to the re-encryption apparatus 4C under the control of the control unit 35.

The re-encryption key generation unit 34 has, for example, a function to generate a re-encryption key based on the private key (the first private key of the first user device) of the re-encryption key generator 30 read out from the private key storage unit 31, the public parameters and the re-encryption key generation key (the second re-encryption key generation key of the second user device) of the decryption apparatus 50 read out from the temporary data storage unit 32, and the plurality of random numbers generated by the random number generation unit 36, and a function to write the re-encryption key to the temporary data storage unit 32.

Here, The second re-encryption key generation key comprises the public parameters (a plurality of system-specific values) and the private key (the second private key of the second user device) of the decryption apparatus 50.

The re-encryption key includes an exponent having a numerator portion and a denominator portion or a scalar having a numerator portion and a denominator portion.

The numerator portion is in form of a linear coupling of the second private key on which at least one of a plurality of private values specifying relations between the public parameters (the system-specific values) and the random numbers is allowed to act.

The denominator portion is the private key (the first private key of the first user device) of the re-encryption key generator 30.

Figure 4:
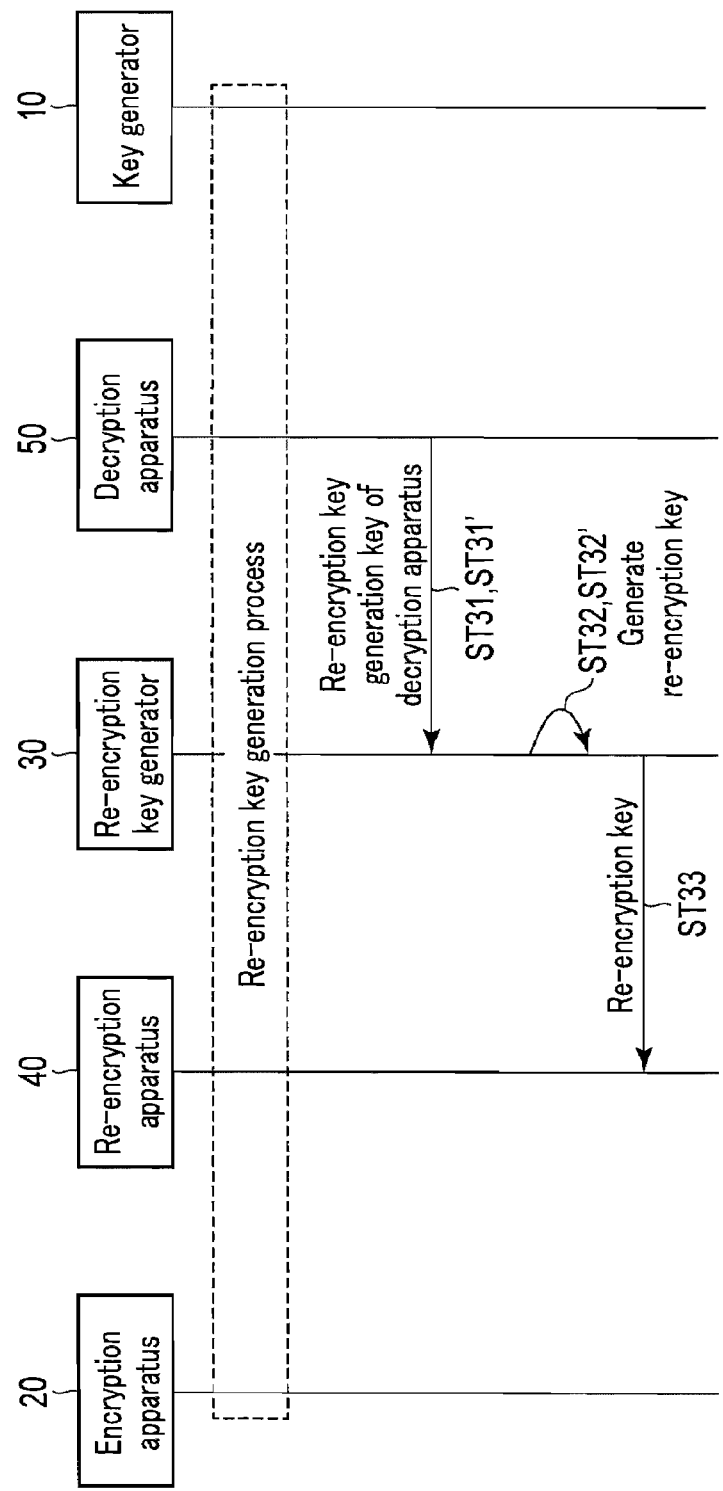
FIG. 4 is a sequence chart for illustrating operations of re-encryption key generation processing according to the first embodiment.

The control unit 35 has a function to controllably allow the units 31 to 34 and 36 to execute the operations depicted in FIG. 4.

The random number generation unit 36 has a function to generate and output random numbers to the re-encryption key generation unit 34.

To receive the re-encryption key generation key of the re-encryption key generator 30 from the key generator 10, the re-encryption key generator 30 has a re-encryption key generation key storage unit (not depicted in the drawings) as a storage circuit which stores the re-encryption key generation key of the re-encryption key generator 30 received from the key generator 10.

The re-encryption apparatus 40 includes a re-encryption key storage unit 41, a temporary data storage unit 42, a communication unit 43, a re-encryption processing unit 44, a re-encryption parameter generation unit 45, and a control unit 47. The re-encryption key storage unit 41, the temporary data storage unit 42, the communication unit 43, the re-encryption processing unit 44, the re-encryption parameter generation unit 45, and the control unit 47 may also be referred to as a re-encryption key storage circuit 41, a temporary data storage circuit 42, a communication circuit 43, a re-encryption processing circuit 44, a re-encryption parameter generation circuit 45, and a control circuit 47, respectively.

The re-encryption key storage unit 41 is a storage device which stores the re-encryption key received from the re-encryption key generator 30.

The temporary data storage unit 42 is a storage device which stores the public parameters and the public key of the re-encryption key generator 30 received from the key generator 10 and temporary data such as intermediate processing data and processing result data of the re-encryption processing unit 44.

The communication unit 43 is a communication interface required to communicate with other apparatuses 10 to 30 and 50, and has, for example, a function to acquire and write the public parameters and the public key of the re-encryption key generator 30 received from the key generator 10, to the temporary data storage unit 42, a function to output ciphertext data received from the encryption apparatus 20 to the re-encryption processing unit 44, and a function to transmit re-encrypted text data stored in the temporary data storage unit 42 to the decryption apparatus 50 under the control of the control unit 46.

The re-encryption processing unit 44 has a function to obtain re-encrypted text by re-encrypting, without decryption, ciphertext data received from the encryption apparatus 20 using the re-encryption key read out from the re-encryption key storage unit 41 and the public parameters and the public key of the re-encryption key generator 30 read out from the temporary data storage unit 42, and a function to write the resultant re-encrypted text data to the temporary data storage unit 42.

Figure 5:
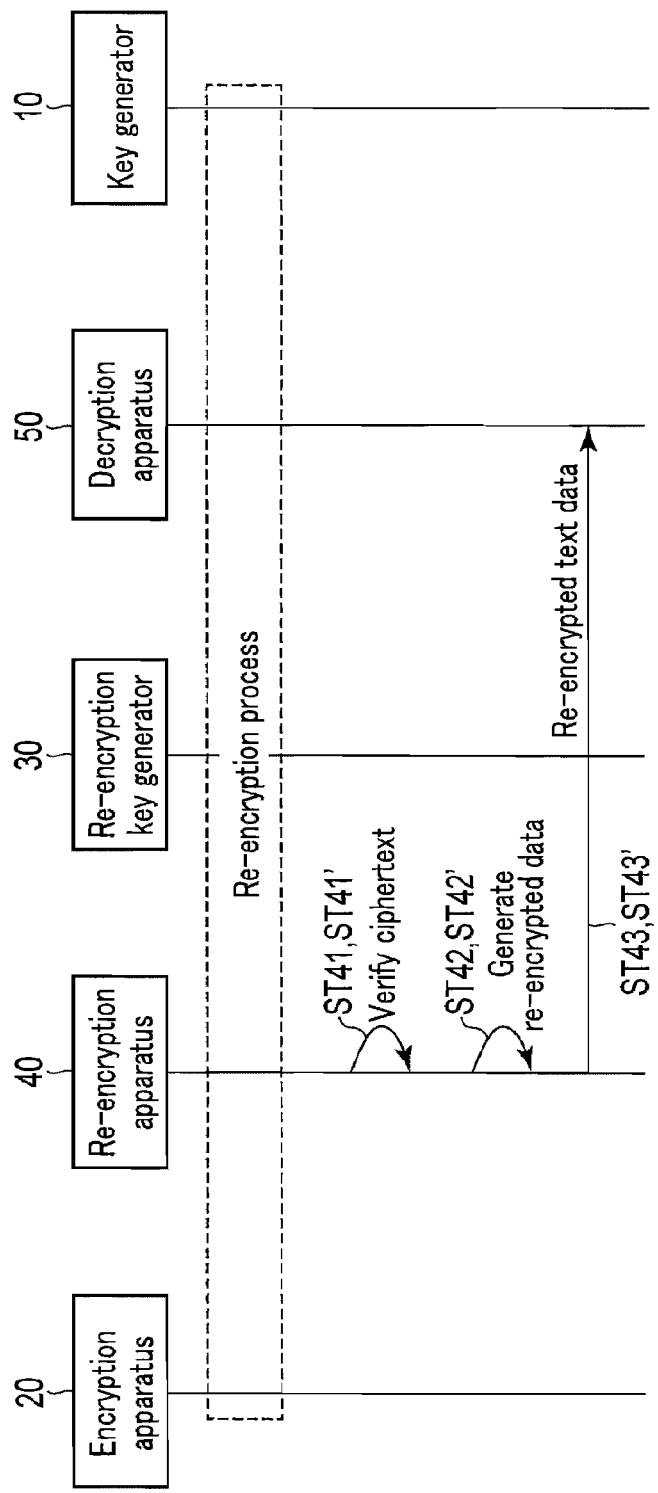
FIG. 5 is a sequence chart for illustrating operations of re-encryption processing according to the first embodiment.

The control unit 46 has a function to controllably allow the units 41 to 45 to execute operations depicted in FIG. 5.

The decryption apparatus 50 includes a private key storage unit 51, a temporary data storage unit 52, a communication unit 53, a decryption processing unit 54, a re-encryption key generation key storage unit 55, and a control unit 56. The private key storage unit 51, the temporary data storage unit 52, the communication unit 53, the decryption processing unit 54, the re-encryption key generation key storage unit 55, and the control unit 56 may also be referred to as a private key storage circuit 51, a temporary data storage circuit 52, a communication circuit 53, a decryption processing circuit 54, a re-encryption key generation key storage circuit 55, and a control circuit 56, respectively.

The private key storage unit 51 is a storage device which stores the private key of the apparatus 50 received from the key generator 10.

The temporary data storage unit 52 is a storage device which stores the public parameters received from the key generator 10, and temporary data such as intermediate processing data and processing result data of the decryption processing unit 54.

The communication unit 53 is a communication interface required to communicate with other apparatuses 10 to 40, and has, for example, a function to write the private key of the apparatus 50 received from the key generator 10 to the private key storage unit 51, a function to acquire and write the private key of the apparatus 50 received from the key generator 10, to the temporary data storage unit 52, and a function to output re-encrypted data received from the re-encryption apparatus 40 to the decryption processing unit 54.

The decryption processing unit 54 has a function to obtain plaintext data by decrypting re-encrypted text data received from the re-encryption apparatus 40 using the private key (the second private key of the second user device) of the decryption apparatus 50 read out from the private key storage unit 51 and the public parameters read out from the temporary data storage unit 52, and a function to write the resultant plaintext data to the temporary data storage unit 52.

The re-encryption key generation key storage unit 55 is a storage device which stores the re-encryption key generation key of the apparatus 50 received from the key generator 10.

Figure 6:
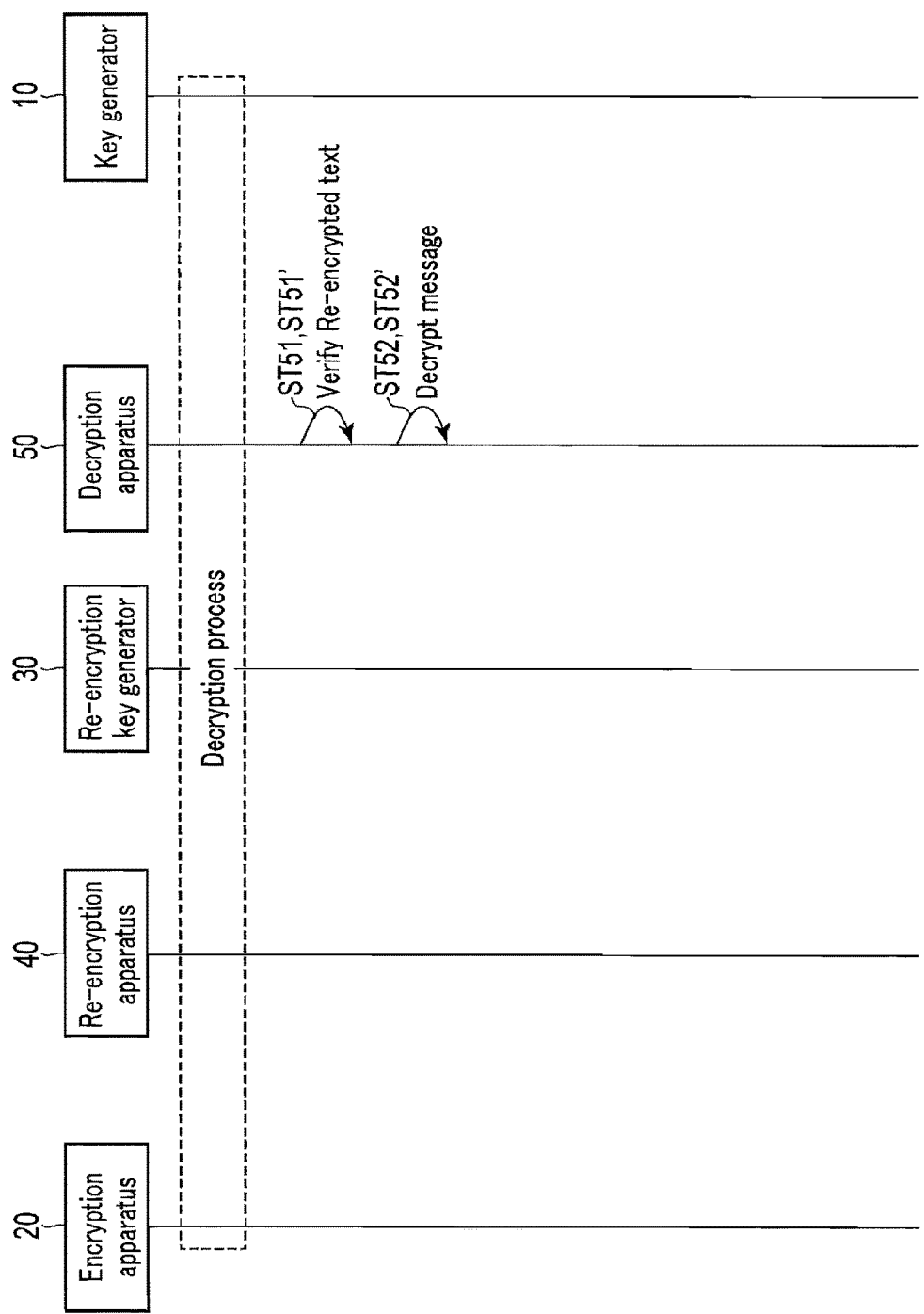
FIG. 6 is a sequence chart for illustrating operations of decryption processing according to the first embodiment.

The control unit 56 has a function to controllably allow the units 51 to 55 to execute operations depicted in FIG. 6.

In the present embodiment, for example, the public parameters are stored in the temporary data storage units of the apparatuses 10 to 50. However, the present invention is not limited to this. The public parameters may be stored in storage units (storage circuits which are different from the temporary data storage units) of the apparatuses 10 to 50. Thus, those of the data stored in the temporary data storage units of the apparatuses 10 to 50 which need not be treated as temporary data may be stored in the storage units (storage circuits which are different from the temporary data storage units). When the public parameters include a plurality of elements, the apparatuses 20 to 50 may exclusively acquire those of the elements of the public parameters which are needed for processing described below. This also applies to the embodiments and modifications described below.

Now, operations of the re-encryption system with the aforementioned configuration will be described below with reference to the sequence charts depicted in FIGS. 2, 3, 4, 5, and 6.

The operations described below are performed in an order of (1) key setup processing, (2) encryption processing, (3) re-encryption key generation processing, (4) re-encryption processing, and (5) decryption processing, by way of example. However, the operations described below need not always be executed in this order. For example, the re-encryption key generation may be executed before the encryption processing. Furthermore, ciphertext data may be decrypted without execution of the re encryption processing.

(1) The key setup processing is executed by the key generator 10, as illustrate in FIG. 2 and in steps ST1 to ST12 described below.

Initially, the public parameter generation unit 13 of the key generator 10 generates or externally acquires public parameters $$par=\{\lambda, p, G_1, G_2, G_T, g, g_1, g_2, u_1, v, h, h_1, h_2, h, u_2, v_2, Sig(\hat{G}, \hat{S}, \hat{V})\}$$

(step ST1). More specifically, the pubic parameter generation unit 13 generates, based on a security parameter $\lambda$ stored in advance in the key parameter storage unit 11, bilinear map groups $(G_1, G_2, G_T)$ which satisfy the prime order $p>2^\lambda$. Note that p is an integer. p may be a prime number or a composite number.

The public parameters generation unit 13 randomly selects a member g of G1 from G1 and a member h of G2 from G2. The public parameters generation unit 13 randomly selects $\alpha$, $\beta$, $\delta$, and $\omega$ from $Z_p^*$, and calculates $g_1=g^\alpha$, $g_2=g^\beta$, $u_1=g^\delta$, $v_1=g^\omega$, $h_1=h^\alpha$, $h_2=h^\beta$, $u_2=h^\delta$, and $v_2=h^\omega$.

Note that $g^\alpha$ represents the $\alpha$th power of g, that is, g multiplied by $\alpha$ in a group $G_1$.

Furthermore, when $g_1=g^\alpha$, $\alpha$ is a number (private value) which specifies the relation between g and $g_1$ in $G_1$. Especially when the group G1 is a multiplicative group, $\alpha$ is referred to as an "exponent". Note that $Z_p^*$ is a set of integers $(=(Z/pZ)^*)$ which are coprime to $Z_p$ and p, and may also be called a multiplicative group $Z_p^*$ for the prime p. $Z_p$ is a set of integers $(=(Z/pZ))$ not less than 0 and less than p.

Moreover, the public parameters generation unit 13 generates a one-time signature algorithm $Sig(\hat{G},\hat{S},\hat{V})$. Furthermore, in the one-time signature algorithm $Sig(\hat{G},\hat{S},\hat{V})$ (to be also referred to as "sig" hereinafter), $\hat{G}$ means a function to generate a pair of a signature key and a verification key (ssk, svk) (both keys are one-time keys). $\hat{S}$ means a function to generate a signature $\sigma$ for a message M, and $\hat{V}$ means a function to verify authenticity of the signature $\sigma$.

For details of the one-time signature, refer to [A. Menezes, P. van Oorschot, S. Vanstone, "Handbook of Applied Cryptography", CRC Press, (1996) pp. 462-471, (1996)].

The bilinear map (to be expressed by "e") is a map e: $G \times G \rightarrow G_T$, and satisfies the following three properties.

1. For any $(g, h) \in G \times G$ and a, $b \in Z$, $e(g^a, h^b)=e(g, h)^{ab}$ holds where Z is a set of integers.

2. For any $(g, h) \in G \times G$, $e(g, h)$ is calculable.

3. When g, $h \neq 1_G$ and $h \neq 1_{G2}$, $e(g, h) \neq 1_{GT}$ always holds where $1_G$ is a unit member of G, and $1_{GT}$ is a unit member of $G_T$.

The bilinear map groups (expressed by $G_1$, $G_2$, and $G_T$) are groups of prime orders p including the bilinear map e: $G_1 \times G_2 \rightarrow G_T$. If $g_1=g^\alpha$, $g_2=g^\beta$, $h_1=h^\alpha$, and $h_2=h^\beta$ for the members h, $h_1$, and $h_2$ of $g_1$, $g_2$, and $G_2$, the aforementioned definition means that the following equation holds:

$$e(g,h_1h_2)=e(g,h^\alpha \cdot h^\beta)=e(g,h^{\alpha+\beta})=e(g,h)^{\alpha+\beta}=$$
$$e(g,h)^\alpha \cdot e(g,h)^\beta=e(g^{\alpha+\beta},h)=e(g^\alpha \cdot g^\beta,h)=e(g_1 g_2,h)$$

Based on this relation, $e(g_1 g_2, h)$ may be interchanged with $e(g, h_1 h_2)$ in the embodiment described below. Note that the plurality of members g, $g_1$, $g_2$, $u_1$, and $v_1$ of $G_1$ and the plurality of members h, $h_1$, $h_2$, $u_2$, and $v_2$ of $G_2$ are a plurality of predetermined system fixed values. $\alpha$, $\beta$, $\delta$, and $\omega$ are a plurality of private values specifying the relation between the system fixed values. The term "system fixed values" may be interchanged with as "fixed values", "members", "public parameters", or "system parameters".

This specification adopts a notation which assumes all of $G_1$, $G_2$, and $G_T$ as multiplicative groups. However, the present invention is not limited to this, and $G_1$, $G_2$, and $G_T$ can be expressed by a notation which regards them as additive groups. That is, for example, $G_1$ and $G_2$ may be expressed as additive groups, and $G_T$ may be expressed as a multiplicative group.

For example, members of $G_1$ and $G_2$ are points on an elliptic curve, and members of $G_T$ may be elements on a finite field.

When $G_1$ and $G_2$ are additive groups, for calculations in $G_1$ and $G_2$, multiplications are replaced with additions. For example, when the members of $G_1$ and $G_2$ are points on the elliptic curve, the calculations in $G_1$ and $G_2$ are point additions. For example, for $g_1$, $g_1=\alpha g$ is possible. $g_1=\alpha g$ represents g multiplied by $\alpha$, that is, summation of $\alpha$ number of g in the group $G_1$. This also applies to the other public parameters. Equations described below can be similarly replaced.

Furthermore, when $g_1=\alpha g$, $\alpha$ is a private value specifying the relation between g and $g_1$ and is referred to as a "scalar" especially when the group $G_1$ is an additive group. For example, when the members of $G_1$ and $G_2$ are points on the elliptic curve, a calculation which determines $\alpha g$ is referred to as a scalar multiplication.

Additionally, in the bilinear map, when, for the members g, $g_1$, and $g_2$ of $G_1$ and the members h, $h_1$, and $h_2$ of $G_2$, $g_1=\alpha g$, $g_2=\beta g$, $h_1=\alpha h$, and $h_2=\beta h$, the following hold: $e(g, h_1+h_2)=e(g, \alpha h+\beta h)=e(g, (\alpha+\beta)h)=e(g, h)\alpha+\beta=(g, h)\alpha \cdot e(g, h)\beta=e((\alpha+\beta)g, h)=e(\alpha g+\beta g, h)=e(g_1+g_2, h)$ In the bilinear map, the map e: $G \times G \to GT$ may be used for the bilinear map group $G=G_1=G_2$, GT.

Subsequently, the public parameter generation unit 13 writes the resultant public parameters in the temporary data storage unit 12. The key generator 10 publishes the public parameters par=($\lambda$, p, $G_1$, $G_2$, $G_T$, g, $g_1$, $g_2$, h, $h_1$, $h_2$, $u_1$, $u_2$, $v_1$, $v_2$, Sig) in the temporary data storage unit 12 (step ST2). Note that when the public parameters have already been published before execution of step ST1, the public parameters may be written to the temporary data storage unit 12, and steps ST1 and ST2 may be skipped.

Letting i be identification information of the re-encryption key generator 30, the key generation unit 14 randomly selects the elements $x_i$, $y_i$, and $z_i$ from $Z_p^*$ to obtain the private key $sk_i=(x_i, y_i, z_i)$ of the re-encryption key generator 30. The key generation unit 14 then generates the key $pk_i=(X_i, Y_{1i}, Z_i, Z_{1i})$ of the re-encryption key generator 30 using the private key $sk_i$ and the public parameters par. This is expressed as follows.

$$X_i=g^{x_i}, Y_{1i}=g_1^{y_i}, Z_i=g^{z_i}, Z_{1i}=g_1^{z_i},$$

The key generation unit 14 further generates a re-encryption key generation key $rk_i=(T_i, T_{1i}, T_{2i})$ using the private key $sk_i$ and the public parameters par (step ST3). This is expressed as follows.

$$T_i=h^{x_i}, T_{1i}=h_1^{y_i}, T_{2i}=h_2^{y_i}$$

Subsequently, the key generation unit 14 writes the resultant pair of the public key and the private key and the resultant re-encryption key generation key in the temporary data storage unit 12. The communication unit 15 transmits the private key $sk_i$ and the re-encryption key generation key $rk_i$ stored in the temporary data storage unit 12 to the re-encryption key generator 30 under the control of the control unit 16 (step ST4). The key generator 10 publishes the public key $pk_i$ of the re-encryption key generator 30 stored in the temporary data storage unit 12 (step ST5).

Likewise, letting j be identification information of the decryption apparatus 50, the key generation unit 14 randomly selects the elements $x_j$, $y_j$, and $z_j$ from $Z_p^*$ to obtain the private key $sk_j=(x_j, y_j, z_j)$ of the decryption apparatus 50. The key generation unit 14 then generates the public key $pk_j=(X_j, Y_{1j}, Z_j, Z_{1j})$ of the decryption apparatus 50 using the private key $sk_j$ and the public parameters par. This is expressed as follows.

$$X_j=g^{x_j}, Y_{1j}=g_1^{y_j}, Z_j=g^{z_j}, Z_{1j}=g_1^{z_j},$$

The key generation unit 14 further generates a re-encryption key generation key $rk_j=(T_j, T_{1j}, T_{2j})$ using the private key $sk_j$ and the public parameters par (step ST6). This is expressed as follows.

$$T_j=h^{x_j}, T_{1j}=h_1^{y_j}, T_{2j}=h_2^{y_j}$$

The re-encryption key generation key (second re-encryption key generation key) $rk_j=(T_j, T_{1j}, T_{2j})$ is a plurality of system fixed values (h, $h_1$, $h_2$) and the private key (second private key) of the decryption apparatus 50.

The key generation unit 14 subsequently writes the resultant pair of the public key and the private key and resultant re-encryption key generation key in the temporary data storage unit 12. The communication unit 15 transmits the private key $sk_j$ and the re-encryption key generation key $rk_j$ stored in the temporary data storage unit 12 to the decryption apparatus 50 under the control of the control unit 16 (step ST7). The key generator 10 publishes the public key $pk_j$ of the decryption apparatus 50 stored in the temporary data storage unit 12 (step ST8). Furthermore, if required, the same processes as those in steps ST6 to ST8 may be executed on a private key $sk_h$, public key $pk_h$, and a re-encryption key generation key $rk_h$ of the encryption apparatus 20. Then, the private key $sk_h$ and the re-encryption key generation key $rk_h$ may be transmitted to the encryption apparatus 20, with the public key $pk_h$ published. Alternatively, the key generation unit 14 may transmit exclusively the private key to the encryption apparatus 20, the re-encryption key generator 30, or the decryption apparatus 50 (without transmitting the re-encryption key generation key). Alternatively, the key generation unit 14 may transmit some or all of the public keys generated in the key setup processing. This also applies to the embodiments and modifications described below.

With the above processing, the key setup processing is completed. Hereinafter, each of the apparatuses 20, 30, 40, 50 can acquire and use the public parameter or public key published in steps ST2, ST5, ST8 when appropriate.

(2) The encryption processing is executed by the encryption apparatus 20, as illustrated in FIG. 3 and in steps ST21 to ST24 described below. The encryption apparatus 20 is assumed to have already stored the public key $pk_i$ of the re-encryption key generator 30 in the temporary data storage unit 21. However, if the encryption apparatus 20 has not acquired the public key $pk_i$ of the re-encryption key generator 30 yet, the encryption apparatus 20 may acquire the public key $pk_i$ of the re-encryption key generator 30, for example, from the key generator 10 before step ST22 described below. Similarly, the encryption apparatus 20 is assumed to have already stored the public parameters par in the temporary data storage unit 21. However, if the encryption apparatus 20 has not acquired the public parameters par yet, the encryption apparatus 20 may acquire the public parameters par, for example, from the key generator 10 before step ST21 described below.

The encryption parameter generation unit 23 of the encryption apparatus 20 generates a key pair (ssk, svk)=$\hat{G}$($\lambda$) of a signature key ssk and a verification key svk in the one-time signature using the security parameter $\lambda$ and the key pair generation function $\hat{G}$ in the public parameters (step ST21), and sets the verification key svk in encrypted data $C_1$ ($C_1$=svk).

The encryption parameter generation unit 23 also generates a random number $r \in Z_p^*$, and outputs the random number $r \in Z_p^*$ to the ciphertext generation unit 24.

The ciphertext generation unit 24 generates encrypted data $C_{2X}$, $C_{2Y}$, $C_{2Z}$, $C_{2Z1}$, $C_3$, $C_{41}$, and $C_{42}$ for a message m∈$G_T$ as plaintext data using the random number r and the public key $pk_i$ of the re-encryption key generator 30 (step ST22).

$$C_{2X}=X_i^r, C_{2Y}=Y_{1i}^r, C_{2Z}=Z_i^r, C_{2Z1}=Z_{1i}^r, C_3=$$
$$e(g_1 g_2, h)^r \cdot m, C_{41}=(u_1^{svk} \cdot v)^r, C_{42}=(u_2^{svk} \cdot v_2)^r$$

After completion of step ST22, the ciphertext generation unit 24 generates, for the encrypted data $C_3$ and $C_{41}$, a one-time signature σ by means of the signature generation function Ŝ in the public parameters and the signature key ssk generated in step ST21 (step ST23). The signature σ is described by:

$$σ=Ŝ(ssk,(C_3,C_4))$$

Note that a first augment of the signature generation function Ŝ is a signature key and that a second augment of the signature generation function Ŝ is signature target data. The signature generation function Ŝ uses the signature target data as an input to output a signature.

Subsequently, the ciphertext generation unit 24 generates ciphertext data $C_i=(C_1, C_{2X}, C_{2Y}, C_{2Z}, C_{2Z1}, C_3, C_{41}, C_{42}, σ)$ including the encrypted data $C_1$ to $C_{42}$ and the one-time signature σ, and writes the resultant ciphertext data to the temporary data storage unit 21.

Note that the ciphertext data $C_i=(C_1, C_{2X}, C_{2Y}, C_{2Z}, C_{2Z1}, C_3, C_{41}, C_{42}, α)$ may be modified to ciphertext data $C_i=(C_{2X}, C_{2Y}, C_{2Z}, C_{2Z1}, C_3)$ by omitting verification data ($C_1, C_{41}, C_{42}$, σ) which is not used for decryption when verification processing in step ST41 described below is skipped. In this case, the processing for generating the verification data ($C_1, C_{41}, C_{42}$, σ) is also skipped. In the present embodiment, verification or generation of verification data may be omitted as described above (or described below). This also applies to the embodiments and modifications described below.

In either case, the communication unit 22 transmits the ciphertext data $C_i$ stored in the temporary data storage unit 21 to the re-encryption apparatus 40 under the control of the control unit 25 (step ST24).

Thus, the encryption processing is completed.

(3) The re-encryption key generation processing is executed by the re-encryption key generator 30, as illustrated in FIG. 4 and in steps ST31 to ST33 described below. The re-encryption key generator 30 is assumed to have already stored the public parameters par in the temporary data storage unit 32. However, if the encryption apparatus 20 has not acquired the public parameters par yet, the encryption apparatus 20 may acquire the public parameters par, for example, from the key generator 10 before step ST32 described below.

Now, the decryption apparatus 50 (in an example in FIG. 8, for example, the user A) is assumed to accept to re-encrypt a ciphertext for the re-encryption key generator (in the example in FIG. 8, the group administrator) to a ciphertext for the decryption apparatus 50 (in the example in FIG. 8, for example, the user A) (in other words, the decryption apparatus 50 is assumed to delegate the decryption right for the ciphertext to the user A). The decryption apparatus 50 transmits the re-encryption key generation key $rk_j$ of the decryption apparatus 50 to the re-encryption key generator 30. The communication unit 33 of the re-encryption key generator 30 acquires and writes the re-encryption key generation key $rk_j$ of the decryption apparatus 50 to the temporary data storage unit 32 under the control of the control unit 35 (step S31). Note that, in step ST31, (instead of the decryption apparatus 50) the key generator 10 may transmit the re-encryption key generation key $rk_j$ to the re-encryption key generator 30. This also applies to the embodiments and modifications described below.

For the temporary data storage unit 32, as depicted in FIG. 11, the re-encryption key generator 30 may hold a public parameter storage unit 321 and a re-encryption key generation key storage unit 322 in the temporary data storage unit 32, store the public parameters par in the public parameter storage unit 321, and store the re-encryption key generation key $rk_j$ of the decryption apparatus 50 in the re-encryption key generation key storage unit 322. Furthermore, the public parameters storage unit 321, which stores the public parameters par, may be located outside the temporary data storage unit 32. Additionally, the re-encryption key generation key storage unit 322, which stores the re-encryption key generation key $rk_j$, may be located outside the temporary data storage unit 32. This also applies to the embodiments and modifications described below. In addition, in step ST4 described above, the communication unit 33 receives the private key $sk_i$ the re-encryption key generator 30 from the key generator 10 and writes the private key $sk_i$ to the private key storage unit 31.

The random number generation unit 36 generates and outputs a random number θ and n∈$Z_p^*$ to the re-encryption key generation unit 34.

The re-encryption key generation unit 34 generates a re-encryption key $R_{ij}$ as follows using the random numbers θ and n, the private key $sk_i$ of the re-encryption key generator 30 stored in the private key storage unit 31, the re-encryption key generation key $rk_j$ of the decryption apparatus 50 stored in the temporary data storage unit 32, and the public parameters par (step S32).

$$R_{ij}=(R_{ij1},R_{ij2},R_{ij3})$$

$R_{ij1}$, $R_{ij2}$, and $R_{ij3}$ are expressed as follows.

$$R_{ij1} = (T_j^\theta \cdot T_{1j}^{\theta-n-1})^{\frac{1}{x_i}} = h^{\frac{\theta x_j + \alpha(\theta-n-1)y_j}{x_i}},$$

$$R_{ij2} = (T_j^n \cdot T_{2j})^{\frac{1}{y_i}} = h^{\frac{nx_j + \beta y_j}{y_i}},$$

$$R_{ij3} = (T_j^\theta \cdot T_{2j})^{\frac{1}{z_i}} = h^{\frac{\theta x_j + \beta y_j}{z_i}}$$

The re-encryption key $R_{ij}=(R_{ij1}, R_{ij2}, R_{ij3})$ includes an exponent having a numerator portion and a denominator portion. When notation is used in which each of $G_1$, $G_2$, and $G_T$ is assumed to be an additive group, the re-encryption key generation key includes a scalar instead of the exponent. The numerator portion of the exponent (scalar) is in form of a linear coupling of the second private key (θxj, α(θ−n−1)$y_j$, $nx_j$, β$y_j$) on which at least one of the plurality of private values (α, β) specifying relations between the system-specific values (h, $h_1$, $h_2$) and the random numbers (θ, n) is allowed to act. In the present embodiment, the numerator portion of the exponent (scalar) is in form of a linear coupling of the second private key (θxj, α(θ−n−1)$y_j$, $nx_j$, β$y_j$) masked by at least one of the plurality of private values (α, β) specifying relations between the system-specific values (h, $h_1$, $h_2$) and the random numbers (θ, n). This keeps the second private key secret, and even if the server colludes with a plurality of users, the decryption right can be hindered from being re-delegated without permission from the transfer source. The denominator portion of the exponent (or the scalar) is the private key $sk_i$ of the re-encryption key generator 30 (first private key).

In this case, the random numbers θ and n may be fixed for each pair of the private key $sk_i$ and the re-encryption key generation key $rk_j$ or may be varied each time a re-encryption key is generated. In the former case, one type of re-encryption key is provided for each pair of the private key $sk_i$ and the re-encryption key generation key $rk_j$. On the other hand, in the latter case, a plurality of re-encryption keys are generated for each pair of the private key $sk_i$ and the re-encryption key generation key $rk_j$. Furthermore, $R_{ij1}$ may be divided into a θ portion and an n portion. For example, $R_{ij1}$ is divided into $R_{ij11}=(T_j\theta T_{1j}^{\theta})^{1/xi}$ and $R_{ij12}=(T_{1j}^{-n-1})^{1/xi}$ and the re-encryption key $R_{ij}$ is defined as $(R_{ij11}, R_{ij12}, R_{ij2}, R_{ij3})$. During calculation, $R_{ij11}$ is multiplied by $R_{ij12}$ to create $R_{ij1}$. Furthermore, although two random numbers are selected in this case, three or more random numbers may be selected. For example, random numbers θ1, θ2, and n may be selected, and $Tj^{\theta}$ and $T_{1j}^{\theta}$ may be replaced with $Tj^{\theta1}Tj^{\theta2}$ and $T1j^{\theta1}T1j^{\theta2}$ for calculation. For example, $R_{ij31}$ is divided into $R_{ij31}=(T_j\theta1 T_{1j}^{\theta})^{1/xi}$ and $R_{ij32}=(Tj^{\theta2}T_{2j})^{1/zi}$ and the re-encryption key $R_{ij}$ is defined as $(R_{ij1}, R_{ij2}, R_{ij31}, R_{ij32})$. During calculation, $R_{ij31}$ is multiplied by $R_{ij32}$ to create $R_{ij3}$. Also for $R_{ij1}$, the θ portion may be divided such that θ=θ1'+θ2'.

Subsequently, the re-encryption key generation unit 34 writes the resultant re-encryption key $R_{ij}$ to the temporary data storage unit 32. The communication portion 33 transmits the re-encryption key $R_{ij}$ stored in the temporary data storage unit 32 to the re-encryption apparatus 40 under the control of the control unit 35 (step S33).

Thus, the re-encryption key generation processing is completed.

(4) The re-encryption processing is executed by the re-encryption apparatus 40, as illustrated in FIG. 5 and in steps ST41 to ST43 described below. The re-encryption apparatus 40 is assumed to have already stored the public key $pk_i$ of the re-encryption key generator 30 in the temporary data storage unit 42. However, if the re-encryption apparatus 40 has not acquired the public key $pk_i$ of the re-encryption key generator 30 yet, the re-encryption apparatus 40 may acquire the public key $pk_i$ of the re-encryption key generator 30, for example, from the re-encryption key generator 30 before step ST41 described below. Similarly, the re-encryption apparatus 40 is assumed to have already stored the public parameters par in the temporary data storage unit 42. However, if the re-encryption apparatus 40 has not acquired the public parameters par yet, the re-encryption apparatus 40 may acquire the public parameters par, for example, from the key generator 10 before step ST41 described below.

The communication unit 43 of the re-encryption apparatus 40 writes the ciphertext data $C_i$ transmitted in step ST24 and the re-encryption key $R_{ij}$ transmitted in step ST33 to the temporary data storage unit 42.

The re-encryption processing unit 44 verifies the ciphertext data $C_i$ stored in the temporary data storage unit 42 using the public parameters par and the public key $pk_i$ of the re-encryption key generator 30 and using the following verification formulas (step ST41).

$$e(C_{2X}, u_2^{C_1} \cdot v_2) = e(X_i, C_{42}),$$

$$e(C_{2Y}, u_2^{C_1} \cdot v_2) = e(Y_i, C_{42}),$$

$$e(C_{2Z}, u_2^{C_1} \cdot v_2) = e(Z_i, C_{42}),$$

$$e(C_{2Z1}, u_2^{C_1} \cdot v_2) = e(Z_{1i}, C_{42}),$$

$$e(g, C_{42}) = e(C_{41}, h),$$

$$\hat{V}(C_1, \sigma, (C_3, C_{41})) = 1. \quad\quad (a1)$$

The first augment of the signature verification function $\hat{V}$ is the verification key, the second augment of the signature verification function $\hat{V}$ is the signature, and the third augment of the signature verification function $\hat{V}$ is the signature target data. Furthermore, the signature verification function $\hat{V}$ verifies the signature for the signature target data using the verification key. The signature verification function $\hat{V}$ outputs "1" upon determining that the signature is authentic and outputs data other than "1" (for example, "0") upon determining that the signature is not authentic.

Therefore, the sixth verification formula in Equation (a1) indicates that the one-time signature σ for the ciphertext data C3 and C41, which are signature target data, is verified using the encrypted data $C_1$ as the verification key, thus determining that the one-time signature σ is authentic.

Note that, when all of the six verification formulas in Equation (a1) hold, the verification succeeds; when at least one of the verification formulas fails to hold, the verification fails.

If the verification succeeds (or the verification processing in step ST41 is skipped), the re-encryption parameter generation unit 45 generates and outputs three random numbers s, t, and $k \in Z_p^*$ to the re-encryption processing unit 44.

The re-encryption processing unit 44 generates re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_2'''$, $C_{5X}$, $C_{5Y}$, and $C_{5Z}$ using the random numbers s, t, and k, the ciphertext data $C_i$, the re-encryption key $R_{ij}$, the public key $pk_i$ of the re-encryption key generator 30, and the public parameters par stored in the temporary data storage unit 42 (step ST42).

$$C_{2X}' = X_i^s, \; C_{2X}'' = C_{2X}^s = X_i^{rs}, \; C_{2Y}' = Y_{1i}^t, \; C_{2Y}'' = C_{2Y}^t = Y_{1i}^{rt},$$

$$C_{2Z}' = Z_i^k, \; C_{2Z}'' = C_{2Z}^k = Z_i^{rk}, \; C_{2Z1}' = Z_{1i}^k, \; C_{2Z1}'' = C_{2Z1}^k = Z_{1i}^{rk},$$

$$C_{5X} = R_{ij1}^{\frac{1}{s}}, \; C_{5Y} = R_{ij2}^{\frac{1}{t}}, \; C_{5Z} = R_{ij3}^{\frac{1}{k}}$$

After completion of step ST42, the re-encryption processing unit 44 replaces all the encrypted data re-encrypted data $C_{2X}'$ to $C_{2Z}$ with the encrypted data $C_{2X}$, $C_{2Y}$, $C_{2Z}$, and $C_{2Z1}$ in the ciphertext data $C_i$ to generate re-encrypted text data $C_j=(C_1, C_{2X}', C_{2X}'', C_{2Y}', C_{2Y}'', C_{2Z}', C_{2X}'', C_{2Z1}', C_{2Z1}'', C_{5X}, C_{5Y}, C_{5Z}, C_3, C_{41}, C_{42}, \sigma)$, and writes the resultant re-encrypted text data $C_j$ in the temporary data storage unit 42. Note that the re-encrypted text data $C_j=(C_1, C_{2X}', C_{2X}'', C_{2Y}', C_{2Y}'', C_{2Z}, C_{2X}'', C_{2Z1}', C_{2Z1}'', C_{5X}, C_{5Y}, C_{5Z}, C_3, C_{41}, C_{42}, \sigma)$ may be modified to $C_j=(C_{2X}'', C_{2Y}'', C_{2X}'', C_{2Z1}'', C_{5X}, C_{5Y}, C_{5Z}, C_3)$ by omitting verification data $(C_1, C_{2X}', C_{2Y}, C_{2Z}, C_{41}, C_{42}, \sigma)$ which is not used in decryption when the verification is skipped. In this case, the processing for generating the verification data $(C_{2Z}, C_{2Y}', C_{2Z}', C_{2Z1}')$ is also skipped.

In either case, the communication unit 43 transmits the re-encrypted text data $C_j$ stored in the temporary data storage unit 42 to the decryption apparatus 50 under the control of the control unit 47 (step ST43).

Thus, the re-encryption processing is completed.

The re-encryption processing unit 44 may skip the verification processing in step ST41 and execute re-encrypted data generation processing in step S42. If the ciphertext data $C_i$ does not include the verification data $(C_1, C_{41}, C_{42}, \sigma)$, the re-encryption processing unit 44 also skips the verification processing in step ST41 and executes re-encrypted data generation processing in step S42.

(5) The decryption processing is executed by the decryption apparatus 50, as illustrated in FIG. 6 and in steps ST51 and ST52 described below. The decryption apparatus 50 is assumed to have already stored the public parameters par in the temporary data storage unit 52. However, if the decryption apparatus 50 has not acquired the public parameters par yet, the decryption apparatus 50 may acquire the public parameters par, for example, from the key generator 10 before step ST51 described below.

The communication unit 53 of the decryption apparatus 50 receives and writes the re-encrypted text data $C_j$ transmitted in step ST43, to the temporary data storage unit 52.

The decryption processing unit 54 verifies the re-encrypted text data $C_j$ stored in the temporary data storage unit 52 using the private key $sk_j$ of the decryption apparatus 50 stored in the private key storage unit 51 and the public parameters par stored in the temporary data storage unit 52 and using the following verification formulas (step ST51).

$$e(C''_{2X}, u_2^{C_1} \cdot v_2) = e(C'_{2X}, C_{42}), \quad (a2)$$
$$e(C''_{2Y}, u_2^{C_1} \cdot v_2) = e(C'_{2Y}, C_{42}),$$
$$e(C''_{2Z}, u_2^{C_1} \cdot v_2) = e(C'_{2Z}, C_{42}),$$
$$e(C''_{2Z1}, u_2^{C_1} \cdot v_2) = e(C'_{2Z1}, C_{42}),$$
$$\left(\frac{e(C'_{2Z}, C_{5Z})}{e(C'_{2X}, C_{5X})}\right)^{\frac{1}{y_j}} \left(\frac{e(C'_{2Z1}, C_{5Z})}{e(C'_{2Y}, C_{5Y})}\right)^{\frac{1}{x_j}} = e(g_1 g_2, h),$$
$$e(g, C_{42}) = e(C_{41}, h),$$
$$\mathcal{V}(C_1, \sigma, (C_3, C_{41})) = 1.$$

If all of the seven verification formulas in Equation (a2) hold, the verification succeeds; if at least one of the verification formulas fails to hold, the verification fails. It should be noted that the private keys $x_j$ and $y_j$ are needed to calculate the fifth formula in Equation (a2).

If the verification succeeds (or the verification processing in step ST51 is skipped), the decryption processing unit 54 obtains a message m by decrypting the re-encrypted text data $C_j$ as follows using the private key $sk_j$ of the decryption apparatus 50 stored the private key storage unit 51 and the public parameters par stored in the temporary data storage unit 52 (step ST52).

$$m = C_3 \Big/ \left\{ \left(\frac{e(C''_{2Z}, C_{5Z})}{e(C''_{2X}, C_{5X})}\right)^{\frac{1}{y_j}} \left(\frac{e(C''_{2Z1}, C_{5Z})}{e(C''_{2Y}, C_{5Y})}\right)^{\frac{1}{x_j}} \right\}$$

Whether or not the decryption result in the above equation is m can be verified as follows.

$$C_3 \Big/ \left\{ \left(\frac{e(C''_{2Z}, C_{5Z})}{e(C''_{2X}, C_{5X})}\right)^{\frac{1}{y_j}} \cdot \left(\frac{e(C''_{2Z1}, C_{5Z})}{e(C''_{2Y}, C_{5Y})}\right)^{\frac{1}{x_j}} \right\} =$$

$$C_3 \Big/ \left\{ \left(\frac{e(g^{z_i rk}, h^{(\theta x_j + \beta y_j)/z_i k})}{e(g^{x_i rs}, h^{(\theta x_j + \alpha(\theta - n-1)y_j)/x_i s})}\right)^{\frac{1}{y_j}} \cdot \left(\frac{e(g^{\alpha z_i rk}, h^{(\theta x_j + \beta y_j)/z_i k})}{e(g^{\alpha y_i, rt}, h^{(nx_j + \beta y_j)/y_i t})}\right)^{\frac{1}{x_j}} \right\} =$$

$$C_3 \Big/ \left\{ \left(\frac{e(g^r, h^{\theta x_j + \beta y_j})}{e(g^r, h^{\theta x_j + \alpha(\theta - n-1)y_j})}\right)^{\frac{1}{y_j}} \cdot \left(\frac{e(g^{\alpha r}, h^{\theta x_j + \beta y_j})}{e(g^{\alpha r}, h^{nx_j + \beta y_j})}\right)^{\frac{1}{x_j}} \right\} =$$

$$C_3 \Big/ \left\{ \left(\frac{e(g^r, h^{\beta y_j})}{e(g^r, h^{\alpha(\theta - n-1)y_j})}\right)^{\frac{1}{y_j}} \cdot \left(\frac{e(g^{\alpha r}, h^{\theta x_j})}{e(g^{\alpha r}, h^{nx_j})}\right)^{\frac{1}{x_j}} \right\} =$$

$$C_3 \Big/ \left\{ \frac{e(g^r, h^\beta)}{e(g^r, h^{\alpha(\theta - n-1)})} \cdot \frac{e(g^{\alpha r}, h^\theta)}{e(g^{\alpha r}, h^n)} \right\} =$$

$$m \cdot e(g_1 g_2, h)^r / (e(g, h)^{\beta r} \cdot e(g, h)^{\alpha r}) = m.$$

Thus, the decryption processing is completed.

Note that the decryption processing unit 54 may skip the verification processing in step ST51 and execute the decryption processing in step ST52. When the re-encrypted text data $C_j$ does not include the verification data ($C_1$, $C_{2X}'$, $C_{2Y}$, $C_{2Z}$, $C_{41}$, $C_{42}$, σ), the decryption processing unit 54 also skips the verification processing in step ST51 and executes the decryption processing in step ST52. Furthermore, m may be a key in place of the message itself. For example, for a common key "$k_{sym}$" in common key cryptosystem, m=$k_{sym}$ may be set to replace m with "$k_{sym}$". In this case, a ciphertext obtained by encrypting a message using the common key "$k_{sym}$" may be appended to the ciphertext data or the re-encrypted text data. The same applies to the embodiments and modifications described below.

Note that, in the present embodiment, the order of processes may be changed as needed. For example, the order of the decryption processing and the ciphertext verification processing may be changed. Likewise, the re-encryption key generation processing may be executed before the encryption processing.

As described above, according to the present embodiment, when a re-encryption key is generated based on the first private key, the second re-encryption key generation key, and the plurality of random numbers, configurations illustrated in (A) to (B) are used as the second re-encryption key generation key and the re-encryption key.

(A) The second re-encryption key generation key comprises the plurality of system-specific values and the second private key.

(B) The re-encryption key includes the exponent having the numerator portion and the denominator portion or the scalar having the numerator portion and the denominator portion.

(C) The numerator portion is in form of a linear coupling of the second private key on which at least one of the plurality of private values specifying the relation between the system-specific values and the random numbers is allowed to act.

(D) The denominator portion is the first private key.

Therefore, such configurations allow the decryption right to be hindered from being re-delegated without permission from the transfer source even if the server colludes with a plurality of users.

In addition, a re-encryption key is generated by processing including a calculation in which the re-encryption key generation key $rk_j$, which is different from the public key of the user B serving as a transfer destination (re-encryption destination), is multiplied directly by a random number, thus hiding information on the public key and private key of the transfer destination user in the re-encryption key. Consequently, the decryption right can be prevented from being re-delegated without permission from the transfer source even if the server colludes with a plurality of users. This also obviates the need to demand excessively high reliability from the server, allowing provision of a file sharing system that can be securely utilized by users. Moreover, since the re-encryption key $R_{ij}$ is generated based on the re-encryption key generation key $rk_j$, the re-encryption key is precluded from being generated unless the transfer destination (in the example in FIG. 8, for example, the user A) notifies the transfer source (in the example in FIG. 8, the group administrator) of the re-encryption key generation key. This allows prevention of execution of re-encryption without permission from the transfer destination (in other words, delegation of the decryption right for the ciphertext to the transfer destination).

Furthermore, in the present embodiment, only the user with the decryption right is allowed to calculate the verification formulas for the re-encrypted ciphertext. That is, the private key of the user with the decryption right is essential for calculating the verification formulas for the re-encrypted ciphertext, allowing any attacker on a communication path to be prevented from verifying the ciphertext. Additionally, any attacker on the communication path can be prevented from determining which ciphertext has been transmitted to which user.

In addition, in the proxy re-encryption system described in Patent Literature 1, verification formulas which verify authenticity of the re-encrypted ciphertext are allowed to be calculated using only the ciphertext, the public parameters, and the public key of the user with the decryption right (calculation can be achieved without the use of any private key). That is, whether the ciphertext is authentic can be verified using only the public information, disadvantageously allowing anyone to determine which ciphertext has been transmitted to which user. In contrast, in the present embodiment, the verification formulas (a2) for the re-encrypted text data $C_j$ include the private keys $x_j$ and $y_j$ of the user with the decryption right, thus allowing the above-described disadvantage to be avoided. This also applies to the embodiments and modifications described below.

[Modification 1]

In the example described in the first embodiment, the encryption apparatus 20 generates ciphertext data, the re-encryption apparatus 40 re-encrypts the ciphertext data to generate re-encrypted text data, and the decryption apparatus 50 decrypts the re-encrypted text data. However, the first embodiment may be modified to a mode in which ciphertext data is decrypted without re-encryption. In this case, exclusively the key setup processing, encryption processing, and decryption processing may be executed. The key setup processing in this modification is the same as that in the first embodiment. The encryption processing and decryption processing in this modification will be described below.

The difference between the encryption processing in the present modification and the encryption processing in the first embodiment lies only in the final step. In order to give the following description using the aforementioned symbols, let i be the identification information on the decryption apparatus 50 for the sake of convenience. In this case, the communication unit 2 of the encryption apparatus 20 transmits ciphertext data $C_i$ stored in the temporary data storage unit 21 to the decryption apparatus 50 under the control of the control unit 25 (step ST24').

The decryption apparatus 50 verifies the ciphertext data $C_i$ generated by the encryption apparatus 20 using the public parameters par and the private key $sk_i$ of the decryption apparatus 50 (step ST51').

$$e(C_{2X}, u_2^{C_1} \cdot v_2) = e(g, C_{42})^{x_i},$$

$$e(C_{2Y}, u_2^{C_1} \cdot v_2) = e(g_1, C_{42})^{y_i},$$

$$e(C_{2Z}, u_2^{C_1} \cdot v_2) = e(g, C_{42})^{z_i},$$

$$e(C_{2Z1}, u_2^{C_1} \cdot v_2) = e(g_1, C_{42})^{z_i},$$

$$e(g, C_{42}) = e(C_{41}, h),$$

$$V(C_1, \sigma, (C_3, C_{41})) = 1. \qquad (a\,3)$$

The decryption apparatus 50 verifies the ciphertext data $C_i$ generated by the encryption apparatus 20 as is the case with step S41 using the public parameters par and the public key $pk_i$ of the decryption apparatus 50.

When all of the six verification formulas in Equation (a3) hold, the verification succeeds; en at least one of the verification formulas fails to hold, the verification fails.

If the verification succeeds (or the verification processing in step ST51' is skipped), the decryption apparatus 50 obtains a message m as follows using the private key $sk_i$ of the decryption apparatus 50 and the public parameters par (step ST52').

$$m = C_3 \Big/ e(C_{2X}, h_1 h_2)^{\frac{1}{x_i}}$$

For this equation, the following may be pre-calculated.

$$(h_1 h_2)^{\frac{1}{x_i}}$$

Then, using this, the following may be calculated.

$$m = C_3 \Big/ e\left(C_{2X}, (h_1 h_2)^{\frac{1}{x_i}}\right)$$

This enables a reduction in calculation processing load for decryption. This also applies to the embodiments and modifications described below.

Whether or not the decryption result in the above equation is m can be verified as follows.

$$C_3 \Big/ e(C_{2X}, h_1 h_2)^{\frac{1}{x_i}} = m \cdot e(g_1 g_2, h)^r \Big/ e(g^{x_i r}, h_1 h_2)^{\frac{1}{x_i}}$$
$$= m \cdot e(g, h)^{(\alpha+\beta)r} \Big/ e(g, h)^{(\alpha+\beta)r}$$
$$= m.$$

[Modification 2]

In addition to Modification 1, a modification is possible in which ciphertext data is decrypted without re-encryption as will be described below. Also in this case, exclusively the key setup processing, the encryption processing, and the decryption processing may be executed. The key setup processing and decryption processing in the present modification are the same as those in the first embodiment. The encryption processing and decryption processing of this modification will be described below. Note that j denotes identification information on the decryption apparatus 50 in the present modification.

Like in step ST21, the encryption parameter generation unit 23 of the encryption apparatus 20 generates (ssk, svk) (ST21') and sets the verification key svk to the encrypted data $C_1$ ($C_1$=svk).

The encryption parameter generation unit 23 of the encryption apparatus 20 generates and outputs four random numbers r, st, t, and $k \in Z_p^*$ to the ciphertext generation unit 24.

The ciphertext generation unit 24 generates encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{5X}$, $C_{5Y}$, $C_{5Z}$, $C_3$, $C_{41}$, and $C_{42}$ with respect to a message $m \in G_T$ as plaintext data using the random numbers r, s, t, and k, the public key $pk_j$ of the decryption apparatus 50, and the public parameters (step ST22').

$$C_{2X}' = Y_{1j}^s, \; C_{2X}'' = Y_{1j}^{rs}, \; C_{2Y}' = X_j^t, \; C_{2Y}'' = X_j^{rt},$$
$$C_{2Z}' = Y_{1j}^k, \; C_{2Z}'' = Y_{1j}^{rk}, \; C_{2Z1}' = X_j^k, \; C_{2Z1}'' = X_j^{rk},$$
$$C_3 = e(g_1 g_2, h)^r \cdot m, \; C_{41} = (u_1^{svk} \cdot v_1)^r, \; C_{42} = (u_2^{svk} \cdot v_2)^r,$$
$$C_{5X} = h_2^{\frac{1}{s}} = h^{\frac{\beta}{s}}, \; C_{5Y} = h^{\frac{1}{t}}, \; C_{5Z} = (h \cdot h_2)^{\frac{1}{k}} = h^{\frac{1+\beta}{k}}$$

After completion of step ST22', the ciphertext generation unit 24 generates a one-time signature in the same manner as that in step ST23 (step ST23').

The ciphertext generation unit 24 subsequently generates ciphertext data $C_j = (C_1, C_{2X}', C_{2X}'', C_{2Y}', C_{2Y}'', C_{2Z}', C_{2Z}'', C_{2Z1}', C_{2Z1}'', C_2''', C_{5X}, C_{5Y}, C_{5Z}, C_3, C_{41}, C_{42}, \sigma)$ including all the encrypted data $C_1$ to $C_4$ and the one-time signature $\sigma$, and writes the resultant ciphertext data to the temporary data storage unit 21.

The communication unit 22 transmits the ciphertext data $C_j$ stored in the temporary data storage unit 21 to the decryption apparatus 50 under the control of the control unit 25 (step S24').

The decryption apparatus 50 verifies the ciphertext data $C_j$ generated by the encryption apparatus 20 in the same manner as that in step ST51 (step ST51'). If the verification succeeds (or the verification processing in step ST51' is skipped), the decryption apparatus 50 obtains a message m by decrypting the ciphertext data $C_j$ as follows using the private key $sk_j$ of the decryption apparatus 50 and the public parameters par (step ST52').

$$m = C_3 \Big/ \left\{ \left( \frac{e(C_{2Z}'', C_{5Z})}{e(C_{2X}'', C_{5X})} \right)^{\frac{1}{y_j}} \left( \frac{e(C_{2Z1}'', C_{5Z})}{e(C_{2Y}'', C_{5Y})} \right)^{\frac{1}{x_j}} \right\}$$

Whether or not the decryption result in the above equation is m can be verified as follows.

$$C_3 \Big/ \left\{ \left( \frac{e(C_{2Z}'', C_{5Z})}{e(C_{2X}'', C_{5X})} \right)^{\frac{1}{y_j}} \cdot \left( \frac{e(C_{2Z1}'', C_{5Z})}{e(C_{2Y}'', C_{5Y})} \right)^{\frac{1}{x_j}} \right\} =$$

$$C_3 \Big/ \left\{ \left( \frac{e(g^{\alpha y_j rk}, h^{(1+\beta)/k})}{e(g^{\alpha y_j rs}, h^{\beta/s})} \right)^{\frac{1}{y_j}} \cdot \left( \frac{e(g^{x_j rk}, h^{(1+\beta)/k})}{e(g^{x_j rt}, h^{1/t})} \right)^{\frac{1}{x_j}} \right\} =$$

$$C_3 \Big/ \left\{ \left( \frac{e(g^{\alpha y_j r}, h^{1+\beta})}{e(g^{\alpha y_j r}, h^\beta)} \right)^{\frac{1}{y_j}} \cdot \left( \frac{e(g^{x_j r}, h^{1+\beta})}{e(g^{x_j r}, h)} \right)^{\frac{1}{x_j}} \right\} =$$

$$C_3 \Big/ \left( e(g^{\alpha y_j r}, h)^{\frac{1}{y_j}} \cdot e(g^{x_j r}, h^\beta)^{\frac{1}{x_j}} \right) =$$

$$m \cdot e(g_1 g_2, h)^r / (e(g, h)^{\alpha r} \cdot e(g, h)^{\beta r}) = m.$$

[Modification 3]

As described above, in the bilinear map, a relation $e(g_1 g_2, h) = e(g, h_1 h_9)$ holds, and thus, $e(g_1 g_2, h)$ may be replaced with $e(g, h_1 h_2)$. Then, g2 appears in none of the algorithms and may thus be excluded from the parameters. Thus, the amount of data can be reduced. This also applies to Modification 1 and Modification 2.

[Modification 4]

In the first embodiment, e: $G_1 \times G_2 \to G_T$ is used as a bilinear map. However, as described above, the map e: $G_1 \times G_2 \to G_T$ may be used for the bilinear map group $G = G_1 = G_2$, $G_T$. In this case, both g and h ($g \neq h$) may be selected from G ($G_1 = G_2$), with the remaining part of the calculation executed as in the case of Embodiment 1. Moreover, in this case, $u_2$, $v_2$, and $C_{42}$ in the algorithm may be replaced with $u_1$, $v_1$, and $C_{41}$, respectively, and the verification formula "$e(g, C_{42}) = e(C_{41}, h)$" may be deleted from Equation (a1), Equation (a2), and Equation (a3). Then, $C_{42}$, $u_2$, and $v_2$ are prevented from appearing in the algorithm, and thus, $u_2$ and $v_2$ may be excluded from the parameters, with $C_{42}$ deleted from the ciphertext. Thus, the amount of data can be reduced. This also applies to Modification 1, Modification 2, and Modification 3.

Second Embodiment

In the present embodiment, an example will be described in which a re-encryption key is updated every certain period. As a parameter which expresses a period, a time parameter L is used. Of the key setup processing, the encryption processing, the re-encryption key generation processing, the re-encryption processing, and the decryption processing, the encryption processing, the re-encryption key generation processing, and the re-encryption processing use the time parameter. The time parameter is used as follows. For example, when the encryption processing is executed in a certain period $t_1$, the encryption processing to be described later is executed with $L = t_1$; when the encryption processing is executed in the next period $t_2$, the encryption processing to be described later is executed with $L = t_2$. The key setup processing, the encryption processing, the re-encryption key generation processing, the re-encryption processing, and the decryption processing in the present embodiment will be described below. Note that components of the second embodiment common to the first embodiment described above will be described using the same reference numerals and a description thereof will not be repeated.

(1) Key Setup Processing

A public parameter generation unit 13 of a key generator 10 generates public parameters par or acquires the public parameters par from an external source (ST1). Letting i be identification information on a re-encryption key generator 30, a key generation unit 14 randomly selects elements $x_i$, $y_i$, $z_i$, and $w_i$ from $Z_p^*$ to obtain a private key $sk_i = (x_i, y_i, z_i, w_i)$ of the re-encryption key generator 30. The key generation unit 14 then generates a public key $pk_i = (X_i, Y_{1i}, Z_i, Z_{1i}, W_i)$ of the re-encryption key generator 30 using the private key $sk_i$ and the public parameters par. This is expressed as follows.

$$X_i = g^{x_i}, Y_{1i} = g_1^{y_i}, Z_i = g^{z_i}, Z_{1i} = g_1^{z_i}, W_i = g^{w_i}$$

The key generation unit 14 further generates a re-encryption key generation key $rk_i = (T_i, T_{1i}, T_{2i})$ using the private key $sk_i$ and the public parameters par (step ST3). This is expressed as follows.

$$T_i = h^{x_i}, T_{1i} = h_1^{y_i}, T_{2i} = h_2^{y_i}$$

Similarly, letting j be identification information on a decryption apparatus 50, a key generation unit 14 randomly selects elements $x_j$, $y_j$, $z_j$, and $w_j$ from $Z_p^*$ to obtain a private key $sk_j = (x_j, y_j, z_j, w_j)$ of the decryption apparatus 50. The key generation unit 14 then generates a public key $pk_j=(X_j, Y_{1j}, Z_j, Z_{1j}, W_j)$ of the decryption apparatus 50 using the private key $sk_i$ and the pubic parameters par. This is expressed as follows.

$$X_j=g^{x_j}, Y_{1j}=g_1^{y_j}, Z_j=g^{z_j}, Z_{1j}=g_1^{z_j}, W_j=g^{w_j}$$

The key generation unit 14 further generates a re-encryption key generation key $rk_j=(T_j, T_{1j}, T_{2j})$ using the private key $sk_i$ and the public parameters par (step ST6). This is expressed as follows.

$$T_j=h^{y_j}, T_{1j}=h_1^{y_j}, T_{2j}=h_2^{y_j}$$

(2) Encryption Processing

As in the first embodiment, an encryption parameter generation unit 23 of an encryption apparatus 20 generates (ssk, svk) (step ST21), and sets a verification key svk for encrypted data $C_1$ ($C_1$=svk).

The encryption parameter generation unit 23 also generates and outputs a random number $r \in Z_p^*$ to a ciphertext generation unit 24.

The ciphertext generation unit 24 generates encrypted data $C_{2X}, C_{2Y}, C_{2Z}, C_{2Z1}, C_{2F}, C_3, C_{41}$, and $C_{42}$ with respect to a message $m \in G_T$ as plaintext data using the random number r, the public key $pk_i$ of the re-encryption key generator 30, the public parameters par, and the time parameter L (step ST22).

$$C_{2X}=X_i^r, C_{2Y}=Y_{1i}^r, C_{2Z}=Z_i^r, C_{2Z1}=Z_{1i}^r, C_{2F}=F_i(L)^r,$$
$$C_3=e(g_1g_2,h)^r \cdot m, C_{41}=(u_1^{svk} \cdot v_1)^r, C_{42}=(u_2^{svk} \cdot v_2)^r$$

In this case, a function) is defined as follows.

$$F_i(L)=g^L \cdot W_i=g^{L+w_i}(L \in Z_p^*)$$

As a method in which the encryption apparatus 20 (or a re-encryption key generator 30 described below) acquires the time parameter, for example, the following method may be used. A certain entity (for example, a server Sv, a server different from the server Sv, a user administrator, a group administrator, an administrator different from the user administrator and the group administrator, a user A, a user B, a user B, or a user different from the users A to C) may hold a time parameter generator (not depicted in the drawings) which generates a time parameter and notify the encryption apparatus 20 (or the re-encryption key generator 30) of the time parameter. Alternatively, a function may be defined which uses a time of day as an input and the time parameter as an output so that the time parameter can be generated using the time of day and the function. In this case, the encryption apparatus 20 (or the re-encryption key generator 30) may use, as the time parameter L, an output value of the function using, as an input, information (a numerical value for the date when encryption processing (re-encryption key generation processing) is to be executed) based on the time of day when the encryption processing (re-encryption key generation processing) is to be executed. The encryption apparatus 20 (or the re-encryption key generator 30) need not acquire any time parameter from any other apparatus. Alternatively, one of the key generator 10, the encryption apparatus 20, the re-encryption key generator 30, a re-encryption apparatus 40, and the decryption apparatus 50 may generate a time parameter and notify the apparatuses other than this apparatus (which generates the time parameter) of the time parameter. Alternatively, the re-encryption key generator 30 acquires a re-encryption key generation key of the decryption apparatus 50 from the decryption apparatus 50 as described below, and may acquire, at this time, the time parameter from the decryption apparatus 50 in addition to the re-encryption key generation key. In this case, the decryption apparatus 50 may acquire the time parameter using one of the above-described methods. This also applies to the embodiments and modifications described below.

After completion of step ST22, the ciphertext generation unit 24 generates, for the time parameter L and the encrypted data $C_3$ and $C_{41}$, a one-time signature $\sigma$ by means of a signature generation function $\hat{S}$ in the public parameters and the signature key ssk generated in step ST21 (step ST23).

$$\sigma=\hat{S}(ssk,(L,C_3,C_{41}))$$

Incidentally, the ciphertext generation unit 24 may generate the one-time signature $\sigma$ for the encrypted data $C_3, C_{41}$ as data to be signed without including the time parameter L. This also applies to embodiments and modifications described later.

The ciphertext generation unit 24 subsequently generates ciphertext data $C_i=(L, C_1, C_{2X}, C_{2Y}, C_{2Z}, C_{2F}, C_3, C_{41}, C_{42}, \sigma)$ including the time parameter L, all the encrypted data $C_1$ to $C_4$, and the one-time signature $\sigma$, and writes the resultant ciphertext data to a temporary data storage unit 21.

A communication unit 22 transmits the ciphertext data $C_i$ stored in the temporary data storage unit 21 to the re-encryption apparatus 40 under the control of the control unit 25 (step ST24).

(3) Re-Encryption Key Generation Processing

Now, the decryption apparatus 50 (in an example in FIG. 8, for example, the user A) is assumed to accept to re-encrypt a ciphertext for the re-encryption key generator (in the example in FIG. 8, the group administrator) generated using L as the value of the time parameter, to a ciphertext for the decryption apparatus 50 (in the example in FIG. 8, for example, the user A) (in other words, the decryption apparatus 50 is assumed to delegate a decryption right for the ciphertext to the user A. The decryption apparatus 50 transmits the re-encryption key generation key $rk_j$ of the decryption apparatus 50 to the re-encryption key generator 30. A communication unit 33 of the re-encryption key generator 30 acquires and writes the re-encryption key generation key $rk_j$ of the decryption apparatus 50 to a temporary data storage unit 32 under the control of a control unit 35 (step S31).

A random number generation unit 36 generates and outputs four random numbers $\theta$, n, $\delta_x$, and $\delta_y \in Z_p^*$ to a re-encryption key generation unit 34.

The re-encryption key generation unit 34 generates a re-encryption key $R_{ijL}$ as follows using the random numbers $\theta$, n, $\delta_x$, and $\delta_y$, the private key $sk_i$ of the re-encryption key generator 30 stored in a private key storage unit 31, the public key $pk_j$ of the decryption apparatus 50 stored in a temporary data storage unit 32, the public parameters par, and the time parameter L (step ST32).

$$R_{ijL}=(R_{ijL1}, R_{ijL2}, R_{ijL3}, R_{ijL4}, R_{ijL5})$$

$R_{ijL1}, R_{ijL2}, R_{ijL3}, R_{ijL4}, R_{ijL5}$ are expressed as follows.

$$R_{ijL1} = (T_j^\theta \cdot T_{1j}^{\theta-n-1})^{1/x_i} \cdot h^{(L+w_i)\delta_x} = h^{\frac{\theta x_j + \alpha(\theta-n-1)y_j}{z_i} + (L+w_i)\delta_x},$$

$$R_{ijL2} = (T_j^n \cdot T_{2j})^{1/y_i} \cdot h^{(L+w_i)\delta_y} = h^{\frac{nx_j + \beta y_j}{y_i} + (L+w_i)\delta_y},$$

$$R_{ijL3} = (T_j^\theta \cdot T_{2j})^{1/z_i} = h^{\frac{\theta x_j + \beta y_j}{z_i}},$$

$$R_{ijL4} = h^{x_i \delta_x}, R_{ijL5} = h_1^{y_i \delta_y} = h^{\alpha y_i \delta_y}$$

The re-encryption key $R_{ij}=(R_{ij1}, R_{ij2}, R_{ij3}, R_{ijL4}, R_{ijL5})$ includes an exponent having a numerator portion and a denominator portion. When notation is used in which each of $G_1$, $G_2$, and $G_T$ is assumed to be an additive group, the re-encryption key generation key includes a scalar instead of the exponent. The numerator portion of the exponent (scalar) is in form of a linear coupling of a second private key ($\theta$xj, $\alpha(\theta-n-1)y_j$, $nx_j$, $\beta y_j$) on which at least one of a plurality of private values ($\alpha$, $\beta$) specifying relations between system-specific values (h, $h_1$, $h_2$) and random numbers ($\theta$, n) is allowed to act. In the present embodiment, the numerator portion of the exponent (scalar) is in form of a linear coupling of the second private key ($\theta$xj, $\alpha(\theta-n-1)y_j$, $nx_j$, $\beta y_j$) masked by at least one of the plurality of private values ($\alpha$, $\beta$) specifying relations between the system-specific values (h, $h_1$, $h_2$) and the random numbers ($\theta$, n). This keeps the second private key secret, and even if the server colludes with a plurality of users, the decryption right can be hindered from being re-delegated without permission from a transfer source. The denominator portion of the exponent (or the scalar) is a private key $sk_i$ of the re-encryption key generator 30 (first private key).

(4) Re-Encryption Processing

A re-encryption processing unit 44 of the re-encryption apparatus 40 verifies ciphertext data $C_i$ stored in a temporary data storage unit 42 using the public parameters par, the time parameter L included in the ciphertext data $C_i$ stored in the temporary data storage unit 42, and a public key $pk_i$ of the re-encryption key generator 30 and using the following verification formulas (step ST41).

$$e(C_{2X}, u_2^{C_1} \cdot v_2) = e(X_i, C_{42}),$$

$$e(C_{2Y}, u_2^{C_1} \cdot v_2) = e(Y_{1i}, C_{42}),$$

$$e(C_{2Z}, u_2^{C_1} \cdot v_2) = e(Z_i, C_{42}),$$

$$e(C_{2Z1}, u_2^{C_1} \cdot v_2) = e(Z_{1i}, C_{42}),$$

$$e(C_{2F}, u_2^{C_1} \cdot v_2) = e(F_i(L), C_{42}),$$

$$e(g, C_{42}) = e(C_{41}, h),$$

$$\hat{V}(C_1, \sigma, (L, C_3, C_{41})) = 1. \quad \text{(a 4)}$$

When the seventh verification formula in Equation (a4) does not include the time parameter L as signature target data for a one-time signature $\sigma$, the one-time signature $\sigma$ is verified using the encrypted data $C_3$ and $C_{41}$ as the signature target data.

Note that, when all of the seven verification formulas in Equation (a4) hold, the verification succeeds; when at least one of the verification formulas fails to hold, the verification fails.

If the verification succeeds (or the verification processing in step ST41 is skipped), a re-encryption parameter generation unit 45 generates and outputs four random numbers s, t, k, and $\pi \in Z_p^*$ to a re-encryption processing unit 44.

The re-encryption processing unit 44 generates re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2F}'$, $C_{2F}''$, $C_{5X}$, $C_{5Y}$, $C_{5Z}$, $C_{5FX}$, and $C_{5FY}$ as follows using the random numbers s, t, k, and $\pi$, and the ciphertext data $C_i$, the re-encryption key $R_{ijL}$, the public key $pk_i$ of the re-encryption key generator 30, and the public parameters par stored in the temporary data storage unit 42 (step ST42).

$$C_{2X}' = X_i^s, C_{2X}'' = C_{2X}^s = X_i^{rs}, C_{2Y}' = Y_{1i}^t, C_{2Y}'' = C_{2Y}^t = Y_{1i}^{rt},$$

$$C_{2Z}' = Z_i^k, C_{2Z}'' = C_{2Z}^k = Z_i^{rk}, C_{2Z1}' = Z_{1i}^k, C_{2Z1}'' = C_{2Z1}^k = Z_{1i}^{rk},$$

$$C_{2F}' = F_i(L)^\pi, C_{2F}'' = C_{2F}^\pi = F_i(L)^{r\pi}, C_{5X} = R_{ijL1}^{\frac{1}{s}}, C_{5Y} = R_{ijL2}^{\frac{1}{t}},$$

$$C_{5Z} = R_{ijL3}^{\frac{1}{k}}, C_{5FX} = R_{ijL4}^{\frac{\pi}{\pi}}, C_{5FY} = R_{ijL5}^{\frac{\pi}{\pi}}$$

After completion of step ST42, the re-encryption processing unit 44 replaces all the encrypted data re-encrypted data $C_{2X}'$ to $C_{5FY}$ with the encrypted data $C_{2X}$, $C_{2Y}$, $C_{2Z}$, $C_{2Z1}$, $C_{2F}$ in the ciphertext data $C_i$ to generate re-encrypted text data $C_j = (L, C_1, C_{2X}', C_{2X}'', C_{2Y}', C_{2Y}'', C_{2Z}', C_{2Z}'', C_{2Z1}', C_{2Z1}'', C_{2F}', C_{2F}'', C_{5X}, C_{5Y}, C_{5Z}, C_{5FX}, C_{5FY}, C_3, C_{41}, C_{42}, \sigma)$, and writes the resultant ciphertext data to the temporary data storage unit 42. If verification processing in step S51 in decryption processing described below, the re-encrypted text data $C_j = (L, C_1, C_{2X}', C_{2X}'', C_{2Y}', C_{2Y}'', C_{2Z}', C_{2Z}'', C_{2Z1}', C_{2Z1}'', C_{2F}', C_{2F}'', C_{5X}, C_{5Y}, C_{5Z}, C_{5FX}, C_{5FY}, C_3, C_{41}, C_{42}, \sigma)$ may be modified to $C_j = (C_{2X}'', C_{2Y}'', C_{2Z}'', C_{2Z1}'', C_{2F}'', C_{5X}, C_{5Y}, C_{5Z}, C_{5FX}, C_{5FY}, C_3)$ by omitting verification data (L, $C_1$, $C_{2X}'$, $C_{2Y}'$, $C_{2Z}'$, $C_{2Z1}'$, $C_{2F}'$, $C_{41}$, $C_{42}$, $\sigma$) which is not used for decryption. In this case, processing for generating verification data ($C_{2X}'$, $C_{2Y}'$, $C_{2Z}'$, $C_{2Z1}'$) is also omitted.

In either case, the communication unit 43 transmits the re-encrypted text data $C_j$ stored in the temporary data storage unit 42 to the decryption apparatus 50 under the control of a control unit 46 (step ST43).

(5) Decryption Processing

A decryption processing unit 54 of the decryption apparatus 50 verifies the re-encrypted text data $C_j$ stored in a temporary data storage unit 52 using a private key $sk_j$ of the decryption apparatus 50 stored in a private key storage unit 51 and the public parameters par stored in the temporary data storage unit 52 and using the following verification formulas (step ST51).

$$e(C_{2X}'', u_2^{C_1} \cdot v_2) = e(C_{2X}', C_{42}), \quad \text{(a5)}$$

$$e(C_{2Y}'', u_2^{C_1} \cdot v_2) = e(C_{2Y}', C_{42}),$$

$$e(C_{2Z}'', u_2^{C_1} \cdot v_2) = e(C_{2Z}', C_{42}),$$

$$e(C_{2Z1}'', u_2^{C_1} \cdot v_2) = e(C_{2Z1}', C_{42}),$$

$$e(C_{2F}'', u_2^{C_1} \cdot v_2) = e(C_{2F}', C_{42}),$$

$$e(g, C_{42}) = e(C_{41}, h),$$

$$\left( \frac{e(C_{2Z}', C_{5Z}) \cdot e(C_{2F}', C_{5FX})}{e(C_{2X}', C_{5X})} \right)^{\frac{1}{y_j}}.$$

$$\left( \frac{e(C_{2Z1}', C_{5Z}) \cdot e(C_{2F}', C_{5FY})}{e(C_{2Y}', C_{5Y})} \right)^{\frac{1}{x_j}} = e(g_1 g_2, h),$$

$$\hat{V}(C_1, \sigma, (L, C_3, C_{41})) = 1.$$

If all of the eight verification formulas in Equation (a5) hold, the verification succeeds; if at least one of the verification formulas fails to hold, the verification fails. In this case, it should be noted that the private keys $x_j$ and $y_j$ are needed to calculate the seventh formula in Equation (a5).

If the verification succeeds the verification processing in step ST51 is skipped), the decryption processing unit 54 obtains a message m by decrypting the re-encrypted text data $C_j$ as follows using the private key $sk_j$ of the decryption apparatus 50 stored in the private key storage unit 51 and the public parameters par stored in the temporary data storage unit 52 (step ST52).

$$m = C_3 \Big/ \left\{ \left( \frac{e(C''_{2Z}, C_{5Z}) \cdot e(C''_{2F}, C_{5FX})}{e(C''_{2X}, C_{5X})} \right)^{\frac{1}{y_j}} \cdot \left( \frac{e(C''_{2Z1}, C_{5Z}) \cdot e(C''_{2F}, C_{5FY})}{e(C''_{2Y}, C_{5Y})} \right)^{\frac{1}{x_j}} \right\}$$

Whether or not the decryption result in the above equation is m can be verified as follows.

$$C_3 \Big/ \left\{ \left( \frac{e(C''_{2Z}, C_{5Z}) \cdot e(C''_{2F}, C_{5FX})}{e(C''_{2X}, C_{5X})} \right)^{\frac{1}{y_j}} \cdot \left( \frac{e(C''_{2Z1}, C_{5Z}) \cdot e(C''_{2F}, C_{5FY})}{e(C''_{2Y}, C_{5Y})} \right)^{\frac{1}{x_j}} \right\} =$$

$$C_3 \Big/ \left\{ \frac{\left( e\left(g^{z_i rk}, h^{\frac{\theta x_j + \beta y_j}{z_i k}}\right) \cdot e\left(g^{(L+w_i)r\pi}, h^{\frac{x_i \delta_x}{\pi}}\right) \right)^{\frac{1}{y_j}}}{e\left(g^{x_i rs}, h^{\frac{((\theta x_j + \alpha(\theta - n - 1)y_j / x_i) + (L + w_i)\delta_x)}{s}}\right)} \right\} \cdot$$

$$\left\{ \frac{\left( e\left(g^{\alpha z_i rk}, h^{\frac{\theta x_j + \beta y_j}{z_i k}}\right) \cdot e\left(g^{(L+w_i)r\pi}, h^{\frac{\alpha y_i \delta_x}{\pi}}\right) \right)^{\frac{1}{y_j}}}{e\left(g^{\alpha y_i r\pi}, h^{\frac{((nx_j + \beta y_j)/y_j) + (L + w_i)\delta_y}{t}}\right)} \right\} =$$

$$C_3 \Big/ \left\{ \left( \frac{e(g^r, h^{\theta x_j + \beta y_j}) \cdot e(g^{(L+w_i)r}, h^{x_i \delta_x})}{e(g^r, h^{\theta x_j + \alpha(\theta - n - 1)y_j + (L + w_i)x_i \delta_x})} \right)^{\frac{1}{y_j}} \cdot$$

$$\left( \frac{e(g^{\alpha r}, h^{\theta x_j + \beta y_j}) \cdot e(g^{(L+w_i)r}, h^{\alpha y_i \delta_y})}{e(g^{\alpha r}, h^{n x_j + \beta y_j + (L + w_i)y_i \delta_y})} \right)^{\frac{1}{x_j}} \right\} =$$

$$C_3 \Big/ \left\{ \left( \frac{e(g^r, h^{\theta x_j + \beta y_j})}{e(g^r, h^{\theta x_j + \alpha(\theta - n - 1)y_j})} \right)^{\frac{1}{y_j}} \cdot \left( \frac{e(g^{\alpha r}, h^{\theta x_j + \beta y_j})}{e(g^{\alpha r}, h^{n x_j + \beta y_j})} \right)^{\frac{1}{x_j}} \right\} =$$

$$C_3 \Big/ \left\{ \left( \frac{e(g^r, h^{\beta y_j})}{e(g^r, h^{\alpha(\theta - n - 1)y_j})} \right)^{\frac{1}{y_j}} \cdot \left( \frac{e(g^{\alpha r}, h^{\theta x_j})}{e(g^{\alpha r}, h^{n x_j})} \right)^{\frac{1}{x_j}} \right\} =$$

$$C_3 \Big/ \left\{ \frac{e(g^r, h^\beta)}{e(g^r, h^{\alpha(\theta - n - 1)})} \cdot \frac{e(g^{\alpha r}, h^\theta)}{e(g^{\alpha r}, h^n)} \right\} =$$

$$m \cdot e(g_1 g_2, h)^r / e(g, h)^{\beta r} \cdot e(g, h)^{\alpha r} = m.$$

In the present embodiment, the order of processes may be changed as needed. For example, the decryption processing and the ciphertext verification processing may be changed. Likewise, the re-encryption key generation processing may be executed before the encryption processing.

As described above, the present embodiment is configured such that the re-encryption key $R_{ijL}$ is generated based on the random numbers θ, n, δx, and δy, the re-encryption key generation key $rk_j$, and the time parameter L. The present embodiment thus not only produces the same effects as those of the first embodiment but also allows whether or not to delegate the decryption right to be determined according to a period of time, enabling more detailed and deliberate access control. Furthermore, even after the decryption right for a ciphertext for a transfer source (in the example in FIG. 8, the group administrator) is delegated to a transfer destination (in the example in FIG. 8, for example, the user B) during a certain period, the decryption right for the ciphertext for the transfer source is not granted to the transfer destination for the next period. In other words, the decryption right for the transfer destination (for the ciphertext for the transfer source) can be invalidated, allowing a more convenient file sharing system to be provided.

[Modification 5]

In the example described in the second embodiment, the encryption apparatus 20 generates ciphertext data, the re-encryption apparatus 40 re-encrypts the ciphertext data to generate re-encrypted text data, and the decryption apparatus 50 decrypts the re-encrypted text data. However, the second embodiment may be modified to a mode in which ciphertext data is decrypted without re-encryption. In this case, exclusively the key setup processing, the encryption processing, and the decryption processing may be executed. The key setup processing in this modification is the same as the key setup processing in the second embodiment. The encryption processing and decryption processing in this modification will be described below.

The difference between the encryption processing in the present modification and the encryption processing in the second embodiment lies only in the final step. In order to give the following description using the aforementioned symbols, let i be the identification information on the decryption apparatus 50 for the sake of convenience. In this case, a communication unit 22 of the encryption apparatus 20 transmits ciphertext data $C_i$ stored in the temporary data storage unit 21 to the decryption apparatus 50 under the control of a control unit 25 (step ST24').

The decryption apparatus 50 verifies the ciphertext data $C_i$ generated by the encryption apparatus 20 using the public parameters par and the private key $sk_i$ of the decryption apparatus 50 (step ST51').

$$e(C_{2X}, u_2^{C_1} \cdot v_2) = e(g, C_{42})^{x_i},$$

$$e(C_{2Y}, u_2^{C_1} \cdot v_2) = e(g_1, C_{42})^{y_i},$$

$$e(C_{2Z}, u_2^{C_1} \cdot v_2) = e(g, C_{42})^{z_i},$$

$$e(C_{2Z1}, u_2^{C_1} \cdot v_2) = e(g_1, C_{42})^{z_i},$$

$$e(C_{2F}, u_2^{C_1} \cdot v_2) = e(g, C_{42})^{L+w_i},$$

$$e(g, C_{42}) = e(C_{41}, h),$$

$$\hat{V}(C_1, \sigma, (L, C_3, C_{41})) = 1. \tag{a 6}$$

The decryption apparatus 50 verifies the ciphertext data $C_i$ generated by the encryption apparatus 20 using the public parameters par and the public key $pk_i$ of the decryption apparatus 50 as is the case with step ST41.

Note that, when all of the seven verification formulas in Equation (a6) hold, the verification succeeds; when at least one of the verification formulas fails to hold, the verification fails.

If the verification succeeds (or the verification processing in step ST51' is skipped), the decryption apparatus 50 obtains a message m by decrypting the ciphertext data $C_i$ using the private key $sk_i$ of the decryption apparatus 50 and the public parameters par (ST52').

$$m = C_3 \Big/ e(C_{2X}, h_1 h_2)^{\frac{1}{x_i}}$$

Whether or not the decryption result in the above equation is m can be verified as follows.

$$C_3 \Big/ e(C_{2X}, h_1 h_2)^{\frac{1}{x_i}} = m \cdot e(g_1 g_2, h)^r \Big/ e(g^{x_i r}, h_1 h_2)^{\frac{1}{x_i}} =$$
$$m \cdot e(g, h)^{(\alpha+\beta)r} / e(g, h)^{(\alpha+\beta)r} = m.$$

[Modification 6]

In addition to Modification 5, a modification is possible in which ciphertext data is decrypted without re-encryption as will be described below. Also in this case, exclusively the Key setup processing, the encryption processing, and the decryption processing may be executed.

In the key setup processing in the present modification, letting I be identification information on the decryption apparatus 50, the key generation unit 14 uses the private key $sk_i$ and the public parameters par not only to execute the key setup processing according to the second embodiment but also to generate $W'_j$ to set the public key of the re-encryption key generator 30 to be $pk_j=(X_j, Y_{1j}, Z_j, Z_{1j}, W_j, W'_j)$ (compared to the second embodiment, Modification 6 additionally has $W'_j$. This is expressed as follows.

$$W'_j = h^{w_j}$$

The decryption processing in the present modification is the same as the decryption processing in the second embodiment. The encryption processing and the decryption processing in the present modification will be described. In the present modification, identification information on the decryption apparatus 50 is denoted by j.

An encryption parameter generation unit 23 of the encryption apparatus 20 generates (ssk, svk) (step ST21') as is the case with step ST21 in the first embodiment, and sets a verification key svk in the encrypted data $C_1$ ($C_1$=svk).

Furthermore, the encryption parameter generation unit 23 generates and outputs seven random numbers r, s, t, k, π, $\delta_x$, $\delta_y \in Z_p^*$ to a re-encryption processing unit 44.

The ciphertext generation unit 24 generates encrypted data $C_{2X'}$, $C_{2X''}$, $C_{2Y'}$, $C_{2Y''}$, $C_{2Z'}$, $C_{2Z''}$, $C_{2Z1'}$, $C_{2Z1''}$, $C_{2F'}$, $C_{2F''}$, $C_{5X}$, $C_{5Y}$, $C_{5Z}$, $C_{5FX}$, $C_{5FY}$, $C_3$, $C_{41}$, and $C_{42}$ expressed below with respect to a message m∈GT as plaintext data using the random numbers r, s, t, k, π, $\delta_x$, and $\delta_y$, the public key $pk_j$ of the decryption apparatus 50, the public parameters, and the time parameter (step ST22').

$$C'_{2X} = Y^s_{1j}, \ C''_{2X} = Y^{rs}_{1j}, \ C'_{2Y} = X^t_j, \ C''_{2Y} = X^{rt}_j,$$
$$C'_{2Z} = Y^k_{1j}, \ C''_{2Z} = Y^{rk}_{1j}, \ C'_{2Z1} = X^k_j, \ C''_{2Z1} = X^{rk}_j,$$
$$C'_{2F} = F_j(L)^\pi, \ C''_{2F} = F_j(L)^{r\pi},$$
$$C_3 = e(g_1 g_2, h)^r \cdot m,$$
$$C_{41} = (u_1^{svk} \cdot v_1)^r, \ C_{42} = (u_2^{svk} \cdot v_2)^r,$$
$$C_{5X} = \left(h_2 \cdot (h^L \cdot W'_j)^{\delta_y}\right)^{\frac{1}{s}} = h^{\frac{\beta+(L+w_j)\delta_y}{s}},$$
$$C_{5Y} = \left(h \cdot (h^L \cdot W'_j)^{\delta_x}\right)^{\frac{1}{t}} = h^{\frac{1+(L+w_j)\delta_x}{t}},$$
$$C_{5Z} = (h \cdot h_2)^{\frac{1}{k}} = h^{\frac{1+\beta}{k}},$$
$$C_{5FX} = (T_{1j})^{\frac{\delta_y}{\pi}}, \ C_{5FY} = (T_j)^{\frac{\delta_x}{\pi}}$$

After completion of step ST22', the ciphertext generation unit 24 generates a one-time signature σ in the same manner as that in step ST23.

The ciphertext generation unit 24 subsequently generates ciphertext data $C_j$=(L, $C_{2X'}$, $C_{2X''}$, $C_{2Y'}$, $C_{2Y''}$, $C_{2Z'}$, $C_{2Z''}$, $C_{2Z1'}$, $C_{2Z1''}$, $C_{2F'}$, $C_{2F''}$, $C_{5X}$, $C_{5Y}$, $C_{5Z}$, $C_{5FX}$, $C_{5FY}$, $C_3$, $C_{41}$, $C_{42}$, σ) including the time parameter L, all the above-described encrypted data $C_1$ to $C_4$ and the one-time signature σ, and writes the resultant ciphertext data to the temporary data storage unit 21.

The communication unit 22 transmits the ciphertext data $C_j$ in the temporary data storage unit 21 to the decryption apparatus 50 under the control of the control unit 25 (step ST24').

The decryption apparatus 50 verifies the ciphertext data $C_j$ generated by the encryption apparatus 20 in the same manner as that in step ST51 (step ST51'). If the verification succeeds (or the verification processing in step ST51' is skipped), the decryption apparatus 50 obtains a message m by decrypting the ciphertext data $C_j$ as follows using the private key $sk_j$ and the public parameters par (step ST52').

$$m = C_3 \Big/ \left\{ \left( \frac{e(C''_{2Z}, C_{5Z}) \cdot e(C''_{2F}, C_{5FX})}{e(C''_{2X}, C_{5X})} \right)^{\frac{1}{y_j}} \cdot \left( \frac{e(C''_{2Z1}, C_{5Z}) \cdot e(C''_{2F}, C_{5FY})}{e(C''_{2Y}, C_{5Y})} \right)^{\frac{1}{z_j}} \right\}$$

Whether or not the decryption result in the above equation is m can be verified as follows.

$$C_3 \Big/ \left\{ \left( \frac{e(C''_{2Z}, C_{5Z}) \cdot e(C''_{2F}, C_{5FX})}{e(C''_{2X}, C_{5X})} \right)^{\frac{1}{y_j}} \cdot \right.$$
$$\left. \left( \frac{e(C''_{2Z1}, C_{5Z}) \cdot e(C''_{2F}, C_{5FY})}{e(C''_{2Y}, C_{5Y})} \right)^{\frac{1}{x_j}} \right\} =$$
$$C_3 \Big/ \left\{ \left( \frac{e\left(g^{\alpha y_j rk}, h^{\frac{1+\beta}{k}}\right) \cdot e\left(g^{(L+w_j)r\pi}, h^{\frac{\alpha y_j \delta_y}{\pi}}\right)}{e\left(g^{\alpha y_j rs}, h^{\frac{\beta+(L+w_j)\delta_y}{s}}\right)} \right)^{\frac{1}{y_j}} \cdot \right.$$
$$\left. \left( \frac{e\left(g^{x_j rk}, h^{\frac{1+\beta}{k}}\right) \cdot e\left(g^{(L+w_j)r\pi}, h^{\frac{x_j \delta_x}{\pi}}\right)}{e\left(g^{x_j rt}, h^{\frac{1+(L+w_j)\delta_x}{t}}\right)} \right)^{\frac{1}{x_j}} \right\} =$$
$$C_3 \Big/ \left\{ \left( \frac{e(g^{\alpha y_j r}, h^{1+\beta}) \cdot e(g^{(L+w_j)r}, h^{\alpha y_j \delta_y})}{e(g^{\alpha y_j r}, h^{\beta+(L+w_j)\delta_y})} \right)^{\frac{1}{y_j}} \cdot \right.$$
$$\left. \left( \frac{e(g^{x_j r}, h^{1+\beta}) \cdot e(g^{(L+w_j)r}, h^{x_j \delta_x})}{e(g^{x_j r}, h^{1+(L+w_j)\delta_x})} \right)^{\frac{1}{x_j}} \right\} =$$
$$C_3 \Big/ \left\{ e(g^{\alpha y_j r}, h)^{\frac{1}{y_j}} \cdot e(g^{x_j r}, h^\beta)^{\frac{1}{x_j}} \right\} =$$
$$m \cdot e(g_1 g_2, h)^r / (e(g, h)^{\alpha r} \cdot e(g, h)^{\beta r}) = m.$$

[Modification 7]

As described above, in the bilinear map, a relation $e(g_1 g_2, h) = e(g, h_1 h_2)$ holds, and thus, $e(g_1 g_2, h)$ may replaced with $e(g, h_1 h_2)$. Then, g2 appears in none of the algorithms and may thus be excluded from the parameters. Thus, the amount of data can be reduced. This also applies to Modification 5 and Modification 6.

[Modification 8]

In the second embodiment, e: $G_1 \times G_2 \to G_T$ is used as a bilinear map. However, as described above, the map e: $G_1 \times G_2 \to G_T$ may be used for a bilinear map group $G=G_1=G_2$, $G_T$. In this case, both g and h (g # h) may be selected from G ($G_1=G_2$), with the remaining part of the calculation executed as in the case of Embodiment 1. Moreover, in this case, $C_{42}$, $u_2$, and $v_2$ in the algorithm may be replaced with $C_{41}$, $u_1$, and $v_1$, respectively, and a verification formula "$e(g, C_{42})=e(C_{41}, h)$" may be deleted from Equation (a4), Equation (a5), and Equation (a6). Then, $C_{42}$, $u_2$, and $v_2$ are prevented from appearing in the algorithm, and thus, $u_2$ and $v_2$ may be excluded from the parameters, with $C_{42}$ deleted from the ciphertext. Thus, the amount of data can be reduced. This also applies to Modification 5, Modification 6, and Modification 7.

As described above, according to the present embodiment, when a re-encryption key is generated based on the first private key, the second re-encryption key generation key, and the plurality of random numbers, configurations illustrated in (A) to (D) are used as the second re-encryption key generation key and the re-encryption key.

(A) The second re-encryption key generation key comprises the plurality of system-specific values and the second private key.

(B) The re-encryption key includes the exponent having the numerator portion and the denominator portion or the scalar having the numerator portion and the denominator portion.

(C) The numerator portion is in form of a linear coupling of the second private key on which at least one of the plurality of private values specifying the relation between the system-specific values and the random numbers is allowed to act.

(D) The denominator portion is the first private key.

Therefore, such configurations allow the decryption right to be hindered from being re-delegated without permission from the transfer source even if the server colludes with a plurality of users.

Applications of each of the above-described embodiments will be described below.

For the file sharing system, three systems (1) to (3) described below are available as methods for keeping file data secret from the server as described above.

(1) An individual key system for encrypting a file by means of individual encryption keys for respective users.

(2) A common key system for encrypting a file by means of an encryption key common to the users.

(3) A re-encryption system for encrypting a file using a proxy re-encryption system.

In the individual key system (1), as described above, to share a file also with a new user D, the user A disadvantageously needs to encrypt the file using a public key of the user D and to upload the encrypted file onto the server. Therefore, the system (1) is not suitable for the file sharing system because troublesome processing is needed when a new user is to be added if the system involves a large number of new users and files to be shared.

In the common key system (2), as described above, when a user is excluded from the file sharing system, an additional separate mechanism is disadvantageously needed which updates the private key and the public key common to the users. In the common key system (2), if the private key common to the users leaks for some reason, the leakage may disadvantageously enable all encrypted files to be decrypted. For this reason, the common key system (2) is not suitable for the file sharing system.

On the other hand, in the proxy re-encryption system (3), since the server uses a re-encryption key to re-encrypt one ciphertext to a ciphertext which can be decrypted only by each user, a configuration which does not notify the users of the re-encryption key is adopted to solve the aforementioned problems. For this reason, the proxy re-encryption system (3) is suitable for the file sharing system. The proxy re-encryption system as described above poses no particular problem. However, the server is enabled to create re-encryped texts without permission from the users. Thus, the proxy re-encryption system has room for improvement in terms of realization of secure file sharing. In contrast, the techniques in the above-described embodiments allow the decryption right to be hindered from being re-delegated without permission from the transfer source even if the server colludes with a plurality of users.

The technique described in each of the embodiments can also be distributed in form of a program which can be executed by a computer and which is stored in a storage medium such as a magnetic disk (Floppy™ disk, hard disk, or the like), an optical disk (CD-ROM, DVD, or the like), a magneto-optical disk (MO), or a semiconductor memory.

For the storage medium, any storage format may be used so long as the storage format enables programs to be stored in the storage medium and to be read from the storage medium by the computer.

A part of the processing for implementing the above-described embodiments may be executed by an OS (operating system) which operates on a computer on the basis of an instruction of a program installed from the storage medium in the computer, database management software, and MW (middleware) such as network software.

Furthermore, the storage medium according to each embodiment includes not only a medium independent of a computer but also a storage medium in which a program transmitted through a LAN, the Internet, or the like is stored or temporarily stored through downloading.

The number of storage media is not limited to one. The storage medium according to the present invention involves a case in which the processing in each embodiment is executed through a plurality of media. Any medium configuration may be used.

A computer according to each embodiment is to execute the processing in each embodiment on the basis of the program stored in the storage medium. The computer may be optionally configured; the computer may be a single apparatus such as a personal computer or a system in which a plurality of apparatuses is connected together via a network.

The computer in each embodiment is not limited to a personal computer but is a general term for apparatuses and devices including an arithmetic processing apparatus and a microcomputer included in an information processing apparatus and which can accomplish the functions of the present invention through programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A re-encryption key generator which generates a re-encryption key needed to obtain re-encrypted text data which is configured to be decrypted by means of a second private key of a second user device, by re-encrypting, without decryption, ciphertext data obtained by encrypting plaintext data by means of a first public key of a first user device, the generator comprising:
   a first storage circuit configured to store a first private key corresponding to the first public key;
   a second storage circuit configured to store a second re-encryption key generation key of the second user device which is different from a second public key corresponding to the second private key; and
   a re-encryption key generation device configured to generate the re-encryption key based on the first private key, the second re-encryption key generation key, and a plurality of random numbers,
   wherein the second re-encryption key generation key comprises a plurality of system-specific values and the second private key,
   the re-encryption key includes an exponent having a numerator portion and a denominator portion or a scalar having a numerator portion and a denominator portion,
   the numerator portion is in form of a linear coupling of the second private key on which at least one of a plurality of private values specifying a relation between the system-specific values and the random numbers is allowed to act, and
   the denominator portion is the first private key.

2. The re-encryption key generator according to claim 1, wherein the first public key is generated based on the first private key and a plurality of system fixed values, and
   the second public key is generated based on the second private key and the plurality of system fixed values.

3. The re-encryption key generator according to claim 2, wherein the first private key is represented by $sk_i=(x_i, y_i, z_i)$, the second private key is represented by $sk_j=(x_j, y_j, z_j)$, the plurality of system fixed values relating to the first public key and the second public key is represented by g and $g_1$ (when a bilinear map image which is a group of prime orders p with a bilinear map e: $G_1 \times G_2 \to G_T$ present therein is represented using $G_1$, $G_2$, and $G_T$, g, $g_1 \in G_1$), and when the first public key is represented by $pk_i$, the first public key $pk_i$ includes data $X_i$, $Y_{1i}$, $Z_i$, and $Z_{1i}$ $(X_i=g^{x_i}, Y_{1i}=g_1^{y_i}, Z_i=g^{z_i}, Z_{1i}=g_1^{z_i})$, when the second pubic key is represented by $pk_j$, the second public key $pk_j$ includes data $X_j$, $Y_{1j}$, $Z_j$, and $Z_{1j}$ $(X_j=g^{x_j}, Y_{1j}=g_1^{y_j}, Z_j=g^{z_j}, Z_{1j}=g_1^{z_j})$, the plurality of system fixed values relating to the re-encryption key generation key is represented by h, $h_1$, $h_2$ (h, $h_1$, $h_2 \in G_2$), and when the second re-encryption key generation key is represented by $rk_j$, $rk_j=(T_j, T_{1j}, T_{2j})$, $(T_j=h^{x_j}, T_{1j}=h_1^{y_j}, T_{2j}=h_2^{y_j})$ the plaintext data is represented by m ($m \in G_T$), the random number relating to the ciphertext data is represented by r, the system fixed value relating to the ciphertext data is represented by $g_2$ ($g_2 \in G_1$), and when the ciphertext data is represented by $C_i$ (the bilinear map e: $G_1 \times G_2 \to G_T$ is represented by e(,)), the ciphertext data $C_i$ includes data $C_{2X}$, $C_{2Y}$, $C_{2Z}$, $C_{2Z1}$ and $C_3$, $(C_{2X}=X_i^r, C_{2Y}=Y_{1i}^r, C_{2Z}=Z_i^r, C_{2Z1}=Z_{1i}^r, C_3=e(g_1g_2,h)^r \cdot m)$, the random numbers relating to the re-encryption key are represented by θ and n, and when the re-encryption key is represented by $R_{ij}$, $R_{ij}=(R_{ij1}, R_{ij2}, R_{ij3})$, $($
$R_{ij1} = (T_j^\theta \cdot T_{1j}^{\theta-n-1})^{\frac{1}{x_i}} = h^{\frac{\theta x_j + a(\theta-n-1)y_j}{x_i}}$, $R_{ij2} = (T_j^n \cdot T_{2j})^{\frac{1}{y_i}} = h^{\frac{n x_j + \beta y_j}{y_i}}$, $R_{ij3} = (T_j^\theta \cdot T_{2j})^{\frac{1}{z_i}} = h^{\frac{\theta x_j + \beta y_j}{z_i}}$
$)$ when the re-encrypted text data is represented by $C_j$ (three random numbers are represented by s, t, and k), the re-encrypted text data includes $C_j$ includes $C_{2X}''$, $C_{2Y}''$, $C_{2Z}''$, $C_{2Z1}''$, $C_{5X}$, $C_{5Y}$, $C_{5Z}$, and $C_3$, $($
$C_{2X}'' = C_{2X}^s = X_i^{rs}, C_{2Y}'' = C_{2Y}^t = Y_{1i}^{rt}$, $C_{2Z}'' = C_{2Z}^k = Z_i^{rk}, C_{2Z1}'' = C_{2Z1}^k = Z_{1i}^{rk}$, $C_{5X} = R_{ij1}^{\frac{1}{s}}, C_{5Y} = R_{ij2}^{\frac{1}{t}}, C_{5Z} = R_{ij3}^{\frac{1}{k}}$
$)$, and
a relation between the plaintext data m, the re-encrypted text data $C_j$, and the second private key $sk_j$ is represented by $$m = C_3 \bigg/ \left\{ \left(\frac{e(C_{2Z}'', C_{5Z})}{e(C_{2X}'', C_{5X})}\right)^{\frac{1}{y_j}} \left(\frac{e(C_{2Z1}'', C_{5Z})}{e(C_{2Y}'', C_{5Y})}\right)^{\frac{1}{x_j}} \right\}.$$

4. The re-encryption key generator according to claim 2, wherein the first private key is represented by $sk_i=(x_i, y_i, z_i, w_i)$ the second private key is represented by $sk_j=(x_j, y_j, z_j, w_j)$, the plurality of system fixed values relating to the first public key and the second public key is represented by g and $g_1$ (when a bilinear map image which is a group of prime orders p with a bilinear map e: $G_1 \times G_2 \to G_T$ present therein is represented using $G_1$, $G_2$, and $G_T$, g, $g_1 \in G_1$), and when the first public key is represented by $pk_i$, the first public key $pk_i$ includes data $X_i$, $Y_{1i}$, $Z_i$, $Z_{1i}$ and $W_i$ $(X_i=g^{x_i}, Y_{1i}=g_1^{y_i}, Z_i=g^{z_i}, Z_{1i}=g_1^{z_i}, W_i=g^{w_i})$, when the second public key represented by $pk_j$, the second public key includes data $X_j$, $Y_{1j}$, $Z_j$, $Z_{1j}$, and $W_j$ $(X_j=g^{x_j}, Y_{1j}=g_1^{y_j}, Z_j=g^{z_j}, Z_{1j}=g_1^{z_j}, W_j=g^{w_j})$, the plurality of system fixed values relating to the re-encryption key generation key is represented by h, $h_1$, $h_2$ (h, $h_1$, $h_2 \in G_2$), and when the second re-encryption key generation key is represented by $rk_j$, $rk_j=(T_j, T_{1j}, T_{2j})$, $(T_j=h^{x_j}, T_{1j}=h_1^{y_j}, T_{2j}=h_2^{y_j})$ the plaintext data is represented by m ($m \in G_T$), the random number relating to the ciphertext data is represented by r, the system fixed value relating to the ciphertext data is represented by $g_2$ ($g_2 \in G_1$), a multiplicative group for the order p is representative $Z_p^*$, a time parameter indicative of a period with which the re-encryption key is updated is represented by L, and when the ciphertext data is represented by $C_i$ (the bilinear map e: $G_1 \times G_2 \to G_T$ is represented by e(,)), the ciphertext data $C_i$ includes data $C_{2X}$, $C_{2Y}$, $C_{2Z}$, $C_{2Z1}$, $C_{2F}$, and $C_3$, $$(C_{2X}=X_i^r, C_{2Y}=Y_{1i}^r, C_{2Z}=Z_i^r, C_{2Z1}=Z_{1i}^r, C_{2F}=F_i(L)^r,$$
$$C_3=e(g_1g_2,h)^r \cdot m$$

a function Fi(L) is defined as follows:

$$F_i(L)=g^L \cdot W_i = g^{L+w_i} (L \in \mathbb{Z}_p^*)),$$

the random numbers relating to the re-encryption key are represented by θ, n, $\delta_x$, and $\delta_y$, and when the re-encryption key is represented by $R_{ijL}$, $R_{ijL}=(R_{ijL1}, R_{ijL2}, R_{ijL3}, R_{ijL4}, R_{ijL5})$, $$\left(\begin{aligned}
R_{ijL1} &= (T_j^\theta \cdot T_{1j}^{\theta-n-1})^{1/x_i} \cdot h^{(L+w_i)\delta_x} = h^{\frac{\theta x_j + \alpha(\theta-n-1)y_j}{x_i} + (L+w_i)\delta_x}, \\
R_{ijL2} &= (T_j^n \cdot T_{2j})^{1/y_i} \cdot h^{(L+w_i)\delta_y} = h^{\frac{nx_j+\beta y_j}{y_i}+(L+w_i)\delta_y}, \\
R_{ijL3} &= (T_j^\theta \cdot T_{2j})^{1/z_i} = h^{\frac{\theta x_j+\beta y_j}{z_i}}, \\
R_{ijL4} &= h^{x_i\delta_x}, R_{ijL5} = h_1^{y_i\delta_y} = h^{\alpha y_i\delta_y}
\end{aligned}\right)$$

when the re-encrypted text data is represented (four random numbers are represented by s, t, k, and π), the re-encrypted text data $C_j$ includes $C_{2X}''$, $C_{2Y}''$, $C_{2Z}''$, $C_{2Z1}''$, $C_{2F}''$, $C_{5X}$, $C_{5Y}$, $C_{5Z}$, $C_{5FX}$, $C_3$, $$\left(\begin{aligned}
C_{2X}'' &= C_{2X}^s = X_i^{rs}, C_{2Y}'' = C_{2Y}^t = Y_{1i}^{rt}, \\
C_{2Z}'' &= C_{2Z}^k = Z_i^{rk}, C_{2Z1}'' = C_{2Z1}^k = Z_{1i}^{rk}, \\
C_{2F}'' &= C_{2F}^\pi = F_i(L)^{r\pi}, C_{5X} = R_{ijL1}^{\frac{1}{s}}, C_{5Y} = R_{ijL2}^{\frac{1}{t}}, \\
C_{5Z} &= R_{ijL3}^{\frac{1}{k}}, C_{5FX} = R_{ijL4}^{\frac{1}{h}}, C_{5FY} = R_{ijL5}^{\frac{1}{h}}
\end{aligned}\right),$$

and a relation between the plaintext data m, the re-encrypted text data $C_j$, and the second private key $sk_j$ is represented by $$m = C_3 \Big/ \left\{ \left(\frac{e(C_{2Z}'', C_{5Z}) \cdot e(C_{2F}'', C_{5FX})}{e(C_{2X}'', C_{5X})}\right)^{\frac{1}{y_j}} \cdot \left(\frac{e(C_{2Z1}'', C_{5Z}) \cdot e(C_{2F}'', C_{5FY})}{e(C_{2Y}'', C_{5Y})}\right)^{\frac{1}{x_j}} \right\}.$$

5. A re-encryption apparatus which obtains re-encrypted text data which is configured to be decrypted by means of a second private key of a second user device, by re-encrypting, without decryption, ciphertext data obtained by encrypting plaintext data by means of a first public key of a first user device, the apparatus comprising:

a storage circuit configured to store the re-encryption key pre-generated by a re-encryption key generator; and a re-encryption circuit configured to obtain the re-encrypted text data by re-encrypting the ciphertext data without decryption using the re-encryption key stored in the storage circuit, wherein the re-encryption key is generated based on a first private key corresponding to the first public key, a second re-encryption key generation key of the second user device which is different from a second public key corresponding to the second private key, and a plurality of random numbers, the second re-encryption key generation key comprises a plurality of system-specific values and the second private key, the re-encryption key includes an exponent having a numerator portion and a denominator portion or a scalar having a numerator portion and a denominator portion, the numerator portion is in form of a linear coupling of the second private key on which at least one of a plurality of private values specifying a relation between the system-specific values and the random numbers is allowed to act, and the denominator portion is the first private key.

6. An encryption apparatus which generates ciphertext data obtained by encrypting plaintext data by means of a first public key of a first user device, for a re-encryption apparatus configured to obtain re-encrypted text data which is configured to be decrypted by means of a second private key of a second user device, by re-encrypting, without decryption, the ciphertext data, the apparatus comprising:

a storage circuit configured to store the first public key; and an encryption circuit configured to obtain the ciphertext data by encrypting the plaintext data using the first public key stored in the storage circuit, wherein the re-encryption key is generated based on a first private key corresponding to the first public key, a second re-encryption key generation key of the second user device which is different from a second public key corresponding to the second private key, and a plurality of random numbers, the second re-encryption key generation key comprises a plurality of system-specific values and the second private key, the re-encryption key includes an exponent or a scalar having a numerator portion and a denominator portion, the numerator portion is in form of a linear coupling of the second private key on which at least one of a plurality of private values specifying a relation between the system-specific values and the random numbers is allowed to act, and the denominator portion is the first private key.

7. A decryption apparatus which decrypts re-encrypted text data which is configured to be decrypted by means of a second private key of a second user device after a re-encryption apparatus obtains the re-encrypted text data based on a re-encryption key by re-encrypting, without decryption, ciphertext data obtained by encrypting plaintext data by means of a first public key of a first user device, the apparatus comprising:

a storage circuit configured to store the second private key; and a decryption circuit configured to obtain the plaintext data by decrypting the re-encrypted text data based on the second private key stored in the storage circuit, wherein the re-encryption key is generated based on a first private key corresponding to the first public key, a second re-encryption key generation key of the second user device which is different from a second public key corresponding to the second private key, and a plurality of random numbers, the second re-encryption key generation key comprises a plurality of system-specific values and the second private key, the re-encryption key includes an exponent or a scalar having a numerator portion and a denominator portion, the numerator portion is in form of a linear coupling of the second private key on which at least one of a plurality of private values specifying a relation between the system-specific values and the random numbers is allowed to act, and the denominator portion is the first private key.

8. A non-transitory computer-readable storage medium having a program stored therein, the program being used by a re-encryption key generator which generates a re-encryption key needed to obtain re-encrypted text data which is configured to be decrypted by means of a second private key of a second user device, by re-encrypting, without decryption, ciphertext data obtained by encrypting plaintext data by means of a first public key of a first user device, the program allowing a processor in the re-encryption key generator to execute:

a process of writing a first private key corresponding to the first public key to a first storage circuit in the re-encryption key generator;

a process of writing a second re-encryption key generation key of the second user device which is different from a second public key corresponding to the second private key, to a second storage circuit; and a process of generating the re-encryption key based on the first private key, the second re-encryption key generation key, and a plurality of random numbers, wherein the second re-encryption key generation key comprises a plurality of system-specific values and the second private key, the re-encryption key includes an exponent having a numerator portion and a denominator portion or a scalar having a numerator portion and a denominator portion, the numerator portion is in form of a linear coupling of the second private key on which at least one of a plurality of private values specifying a relation between the system-specific values and the random numbers is allowed to act, and the denominator portion is the first private key.

9. The storage medium according to claim 8, wherein the first public key is generated based on the first private key and a plurality of system fixed values, and the second public key is generated based on the second private key and the plurality of system fixed values.

10. The storage medium according to claim 9, wherein the first private key is represented by $sk_i=(x_i, y_i, z_i)$, the second private key is represented by $sk_j=(x_j, y_j, z_j)$, the plurality of system fixed values relating to the first public key and the second public key is represented by $g$ and $g_1$ (when a bilinear map image which is a group of prime orders p with a bilinear map $e: G_1 \times G_2 \rightarrow G_T$ present therein is represented using $G_1$, $G_2$, and $G_T$, $g, g_1 \in G_1$), and when the first public key is represented by $pk_i$, the first public key $pk_i$ includes data $X_i$, $Y_{1i}$, $Z_i$, and $Z_{1i}$ $$(X_i=g^{x_i}, Y_{1i}=g_1^{y_i}, Z_i=g^{z_i}, Z_{1i}=g_1^{z_i}),$$

when the second public key is represented by $pk_j$, the second public key $pk_j$ includes data $X_j$, $Y_{1j}$, $Z_j$, and $Z_{1j}$ $$(X_j=g^{x_j}, Y_{1j}=g_1^{y_j}, Z_j=g^{z_j}, Z_{1j}=g_1^{z_j}),$$

the plurality of system fixed values relating to the re-encryption key generation key is represented by $h$, $h_1$, $h_2$ ($h, h_1, h_2 \in G_2$), and when the second re-encryption key generation key is represented by $rk_j$, $rk_j=(T_j, T_{1j}, T_{2j})$, $$(T_j=h^{x_j}, T_{1j}=h_1^{y_j}, T_{2j}=h_2^{y_j})$$

the plaintext data is represented by m ($m \in G_T$), the random number relating the ciphertext data is represented by r, the system fixed value relating to the ciphertext data is represented by $g_2$ ($g_2 \in G_1$), and when the ciphertext data is represented by $C_i$ (the bilinear map $e: G_1 \times G_2 \rightarrow G_T$ is represented by $e(,)$), the ciphertext data $C_i$ includes data $C_{2X}$, $C_{2Y}$, $C_{2Z}$, $C_{2Z1}$, and $C_3$, $$(C_{2X}=X_i^r, C_{2Y}=Y_{1i}^r, C_{2Z}=Z_i^r, C_{2Z1}=Z_{1i}^r, C_3=e(g_1g_2,h)^r \cdot m),$$

the random numbers relating to the re-encryption key are represented by $\theta$ and $n$, and when the re-encryption key is represented by $R_{ij}$, $R_{ij}=(R_{ij1}, R_{ij2}, R_{ij3})$, $$\begin{aligned}
R_{ij1} &= (T_j^\theta \cdot T_{1j}^{\theta-n-1})^{\frac{1}{x_i}} = h^{\frac{\theta x_j + \alpha(\theta-n-1)y_j}{x_i}}, \\
R_{ij2} &= (T_j^n \cdot T_{2j})^{\frac{1}{y_i}} = h^{\frac{nx_j+\beta y_j}{y_i}}, \\
R_{ij3} &= (T_j^\theta \cdot T_{2j})^{\frac{1}{z_i}} = h^{\frac{\theta x_j+\beta y_j}{z_i}}
\end{aligned}$$

when the re-encrypted text data is represented by $C_j$ (three random numbers are represented by s, t, and k), the re-encrypted text data $C_j$ includes $C_{2X}''$, $C_{2Y}''$, $C_{2Z}''$, $C_{2Z1}''$, $C_{5X}$, $C_{5Y}$, $C_{5Z}$, and $C_3$, $$\begin{aligned}
C_{2X}'' &= C_{2X}^s = X_i^{rs}, C_{2Y}'' = C_{2Y}^t = Y_{1i}^{rt}, \\
C_{2Z}'' &= C_{2Z}^k = Z_i^{rk}, C_{2Z1}'' = C_{2Z1}^k = Z_{1i}^{rk}, \\
C_{5X} &= R_{ij1}^{\frac{1}{s}}, C_{5Y} = R_{ij2}^{\frac{1}{t}}, C_{5Z} = R_{ij3}^{\frac{1}{k}}
\end{aligned}$$

and a relation between the plaintext data m, the re-encrypted text data $C_j$, and the second private key $sk_j$ is represented by $$m = C_3 \bigg/ \left\{ \left(\frac{e(C_{2Z}'', C_{5Z})}{e(C_{2X}'', C_{5X})}\right)^{\frac{1}{y_j}} \left(\frac{e(C_{2Z1}'', C_{5Z})}{e(C_{2Y}'', C_{5Y})}\right)^{\frac{1}{x_j}} \right\}.$$

11. The storage medium according to claim 9, wherein the first private key is represented by $sk_i=(x_i, y_i, z_i, w_i)$, the second private key is represented by $sk_j=(x_j, y_j, z_j, w_j)$, the plurality of system fixed values relating to the first public key and the second public key is represented by $g$ and $g_1$ (when a bilinear map image which is a group of prime orders p with a bilinear map e: $G_1 \times G_2 \to G_T$ present therein is represented using $G_1$, $G_2$, and $G_T$, g, $g_1 \in G_1$), and when the first public key is represented by $pk_i$, the first public key $pk_i$ includes data $X_i$, $Y_{1i}$, $Z_i$, $Z_{1i}$, and $W_i$ $(X_i = g^{x_i}, Y_{1i} = g_1^{y_i}, Z_i = g^{z_i}, Z_{1i} = g_1^{z_i}, W_i = g^{w_i})$, when the second public key represented by $pk_j$, the second public key $pk_j$ includes data $X_j$, $Y_{1j}$, $Z_j$, $Z_{1j}$, and $W_j$ $(X_j = g^{x_j}, Y_{1j} = g_1^{y_j}, Z_j = g^{z_j}, Z_{1j} = g_1^{z_j}, W_j = g^{w_j})$, the plurality of system fixed values relating to the re-encryption key generation key is represented by h, $h_1$, $h_2$ (h, $h_1$, $h_2 \in G_2$), and when the second re-encryption key generation key is represented by $rk_j$, $rk_j = (T_j, T_{1j}, T_{2j})$, $(T_j = h^{x_j}, T_{1j} = h_1^{y_j}, T_{2j} = h_2^{y_j})$ the plaintext data is represented by m ($m \in G_T$), the random number relating to the ciphertext data is represented by r, the system fixed value relating to the ciphertext data is represented by $g_2$ ($g_2 \in G_1$), a multiplicative group for the order p is representative $Z_p^*$, a time parameter indicative of a period with which the re-encryption key is updated is represented by L, and when the ciphertext data is represented by $C_i$ (the bilinear map e: $G_1 \times G_2 \to G_T$ is represented by e(,)), the ciphertext data $C_i$ includes data $C_{2X}$, $C_{2Y}$, $C_{2Z1}$, $C_{2F}$, and $C_3$, $(C_{2X} = X_i^r, C_{2Y} = Y_{1i}^r, C_{2Z} = Z_i^r, C_{2Z1} = Z_{1i}^r, C_{2F} = F_i(L)^r,$
$C_3 = e(g_1 g_2, h)^r \cdot m$ a function $\varphi(L)$ is defined as follows:

$F_i(L) = g^L \cdot W_i = g^{L+w_i} (L \in Z_p^*))$, the random numbers relating to the re-encryption key are represented by θ, n, $θ_x$, and $δ_y$, and when the re-encryption key is represented by $R_{ijL}$, $R_{ijL} = (R_{ijL1}, R_{ijL2}, R_{ijL3}, R_{ijL4}, R_{ijL5})$, ( $R_{ijL1} = (T_j^θ \cdot T_{1j}^{θ-n-1})^{1/x_i} \cdot h^{(L+w_i)δ_x} = h^{\frac{θx_j + α(θ-n-1)y_j}{x_i} + (L+w_i)δ_x}$, $R_{ijL2} = (T_j^n \cdot T_{2j})^{1/y_i} \cdot h^{(L+w_i)δ_y} = h^{\frac{nx_j + βy_j}{y_i} + (L+w_i)δ_y}$, $R_{ijL3} = (T_j^θ \cdot T_{2j})^{1/z_i} = h^{\frac{θx_j + βy_j}{z_i}}$, $R_{ijL4} = h^{x_i δ_x}$, $R_{ijL5} = h_1^{y_i δ_y} = h^{α y_i δ_y}$

)

when the re-encrypted text data is represented by $C_j$ (four random numbers are represented by s, t, k, and π), the re-encrypted text data $C_j$ includes $C_{2X}''$, $C_{2Y}''$, $C_{2Z}''$, $C_{2Z1}''$, $C_{2F}''$, $C_{5X}$, $C_{5Y}$, $C_{5Z}$, $C_{5FX}$, $C_{5FY}$, $C_3$, ( $C_{2X}'' = C_{2X}^s = X_i^{rs}$, $C_{2Y}'' = C_{2Y}^t = Y_{1i}^{rt}$, $C_{2Z}'' = C_{2Z}^k = Z_i^{rk}$, $C_{2Z1}'' = C_{2Z1}^k = Z_{1i}^{rk}$, $C_{2F}'' = C_{2F}^h = F_i(L)^{rh}$, $C_{5X} = R_{ijL1}^{\frac{1}{s}}$, $C_{5Y} = R_{ijL2}^{\frac{1}{t}}$, $C_{5Z} = R_{ijL3}^{\frac{1}{k}}$, $C_{5FX} = R_{ijL4}^{\frac{1}{π}}$, $C_{5FY} = R_{ijL5}^{\frac{1}{π}}$

), and a relation between the plaintext data m, the re-encrypted text data $C_j$, and the second private key $sk_j$ is represented by $m = C_3 \bigg/ \left\{ \left( \frac{e(C_{2Z}'', C_{5Z}) \cdot e(C_{2F}'', C_{5FX})}{e(C_{2X}'', C_{5X})} \right)^{\frac{1}{y_j}} \cdot \left( \frac{e(C_{2Z1}'', C_{5Z}) \cdot e(C_{2F}'', C_{5FY})}{e(C_{2Y}'', C_{5Y})} \right)^{\frac{1}{x_j}} \right\}$.

12. A non-transitory computer-readable storage medium having a program stored therein, the program being used for a re-encryption apparatus which obtains re-encrypted text data which is configured to be decrypted by means of a second private key of a second user device, by re-encrypting, without decryption, ciphertext data obtained by encrypting plaintext data by means of a first public key of a first user device, the program allowing a processor in the re-encryption apparatus to execute:

a process of writing the re-encryption key pre-generated by a re-encryption key generator to a storage circuit in the re-encryption apparatus; and a process of obtaining the re-encrypted text data by re-encrypting the ciphertext data without decryption using the re-encryption key stored in the storage circuit, wherein the re-encryption key is generated based on a first private key corresponding to the first public key, a second re-encryption key generation key of the second user device which is different from a second public key corresponding to the second private key, and a plurality of random numbers, the second re-encryption key generation key comprises a plurality of system-specific values and the second private key, the re-encryption key includes an exponent having a numerator portion and a denominator portion or a scalar having a numerator portion and a denominator portion, the numerator portion is in form of a linear coupling of the second private key on which at least one of a plurality of private values specifying a relation between the system-specific values and the random numbers is allowed to act, and the denominator portion is the first private key.

13. A non-transitory computer-readable storage medium having a program stored therein, the program being used for an encryption apparatus which generates ciphertext data obtained by encrypting plaintext data by means of a first public key of a first user device, for a re-encryption apparatus configured to obtain re-encrypted text data which is configured to be decrypted by means of a second private key of a second user device, by re-encrypting, without decryption, the ciphertext data, the program allowing a processor in the encryption apparatus to execute:

a process of writing the first public key to a storage circuit in the encryption apparatus; and a process of obtaining the ciphertext data by encrypting the plaintext data using the first public key stored in the storage circuit, wherein the re-encryption key is generated based on a first private key corresponding to the first public key, and a second re-encryption key generation key of the second user device which is different from a second public key corresponding to the second private key, the second re-encryption key generation key comprises a plurality of system-specific values and the second private key, the re-encryption key includes an exponent having a numerator portion and a denominator portion or a scalar having a numerator portion and a denominator portion, the numerator portion is in form of a linear coupling of the second private key on which at least one of a plurality of private values specifying a relation between the system-specific values and the random numbers is allowed to act, and the denominator portion is the first private key.

14. A non-transitory computer-readable storage medium having a program stored therein, the program being used for a decryption apparatus which decrypts re-encrypted text data which is configured to be decrypted by means of a second private key of a second user device after a re-encryption apparatus obtains the re-encrypted text data based on a re-encryption key by re-encrypting, without decryption, ciphertext data obtained by encrypting plaintext data by means of a first public key of a first user device, the program allowing a processor in the decryption apparatus to execute:

a process of writing the second private key to a storage circuit in the decryption apparatus; and a process of obtaining the plaintext data by decrypting the re-encrypted text data based on the second private key stored in the storage circuit, wherein the re-encryption key is generated based on a first private key corresponding to the first public key, a second re-encryption key generation key of the second user device which is different from a second public key corresponding to the second private key, and a plurality of random numbers, the second re-encryption key generation key comprises a plurality of system-specific values and the second private key, the re-encryption key includes an exponent having a numerator portion and a denominator portion or a scalar having a numerator portion and a denominator portion, the numerator portion is in form of a linear coupling of the second private key on which at least one of a plurality of private values specifying a relation between the system-specific values and the random numbers is allowed to act, and the denominator portion is the first private key.

* * * * *